US012388226B2

(12) United States Patent
Kakudo et al.

(10) Patent No.: US 12,388,226 B2
(45) Date of Patent: Aug. 12, 2025

(54) LEAD BLOCK AND ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Takahisa Kakudo, Inukami-gun (JP); Shinichi Hamasaki, Inukami-gun (JP); Rodrigo Kendy Yamashita, Inukami-gun (JP); Yoji Tajiri, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 396 days.

(21) Appl. No.: 17/952,330

(22) Filed: Sep. 26, 2022

(65) Prior Publication Data

US 2023/0012432 A1 Jan. 12, 2023

Related U.S. Application Data

(63) Continuation of application No. PCT/JP2021/005772, filed on Feb. 16, 2021.

(30) Foreign Application Priority Data

Mar. 31, 2020 (JP) ................................ 2020-063104

(51) Int. Cl.
*H01R 9/00* (2006.01)
*H01R 9/24* (2006.01)
(Continued)

(52) U.S. Cl.
CPC ............... *H01R 35/04* (2013.01); *H01R 9/24* (2013.01); *H01R 43/00* (2013.01)

(58) Field of Classification Search
CPC .................................. H01R 9/24; H01R 43/00
See application file for complete search history.

(56) References Cited

U.S. PATENT DOCUMENTS 5,685,728 A 11/1997 Okuhara et al.
5,951,322 A 9/1999 Nishikigi
(Continued)

FOREIGN PATENT DOCUMENTS

EP 1056166 A2 11/2000
EP 2075882 A2 7/2009
(Continued)

OTHER PUBLICATIONS

Decision of Dismissal of Amendment for corresponding JP Application No. 2022-511642, Oct. 29, 2024 (w/ English machine translation).

(Continued)

*Primary Examiner* — Phuong Chi Thi Nguyen
(74) *Attorney, Agent, or Firm* — Mori & Ward, LLP

(57) ABSTRACT

A lead block includes a lead block body and a plurality of busbars. The plurality of busbars is each partially embedded in the lead block body. The plurality of busbars includes a plurality of exposed portions. The plurality of exposed portions each extends in a longitudinal direction and disposed spaced apart from one another in an arrangement direction orthogonal to the longitudinal direction. The plurality of exposed portions includes at least one first exposed portion. The at least one first exposed portion includes a first surface and a first additional surface disposed on a reverse side of the first surface in the arrangement direction. The first surface includes a first cut surface having an area smaller
(Continued)

than an area of the first surface. The first additional surface includes a first additional cut surface having an area smaller than an area of the first additional surface.

20 Claims, 19 Drawing Sheets

(51) Int. Cl.

| | |
|---|---|
| ***H01R 35/04*** | (2006.01) |
| ***H01R 43/00*** | (2006.01) |

(56) References Cited

U.S. PATENT DOCUMENTS

| | | | | |
|---|---|---|---|---|
| 6,354,853 | B1 | 3/2002 | Matsuzaki et al. | |
| 10,587,058 | B2 * | 3/2020 | Kurono | H01R 13/405 |
| 2004/0067670 | A1 | 4/2004 | Rhein et al. | |
| 2008/0113526 | A1 | 5/2008 | Nakatani et al. | |
| 2009/0158585 | A1 | 6/2009 | Yajima | |
| 2011/0130030 | A1 | 6/2011 | Morita | |
| 2017/0110810 | A1 * | 4/2017 | Kurono | H02K 3/50 |
| 2018/0083376 | A1 | 3/2018 | Utsunomiya | |
| 2019/0207352 | A1 | 7/2019 | Ushiyama | |
| 2020/0028403 | A1 * | 1/2020 | Francis | H01R 43/048 |

FOREIGN PATENT DOCUMENTS

| | | |
|---|---|---|
| JP | 10-144371 | 5/1998 |
| JP | 2000-323253 | 11/2000 |
| JP | 2003-022879 | 1/2003 |
| JP | 2003-045598 | 2/2003 |
| JP | 2006-502549 | 1/2006 |
| JP | 2008-123922 | 5/2008 |
| JP | 2009-158169 | 7/2009 |
| JP | 2011-113676 | 6/2011 |
| JP | 2011-134702 | 7/2011 |
| JP | 2017-199594 | 11/2017 |
| WO | WO 2016/152134 | 9/2016 |
| WO | WO 2018/04 7581 | 3/2018 |

OTHER PUBLICATIONS

Decision of Refusal for corresponding JP Application No. 2022-511642, Oct. 29, 2024 (w/ English machine translation).

Japanese Office Action for corresponding JP Application No. 2022-511642, Aug. 20, 2024 (w/ English machine translation).

Japanese Office Action for corresponding JP Application No. 2022-511642, May 14, 2024 (w/ English machine translation).

Extended European Search Report for corresponding EP Application No. 2178578.6-1201, Jul. 28, 2023.

International Search Report for corresponding International Application No. PCT/JP2021/005772, Apr. 27, 2021.

Written Opinion for corresponding International Application No. PCT/JP2021/005772, Oct. 13, 2022.

Korean Office Action for corresponding KR Application No. 10-2022-7037872, Feb. 3, 2025 (w/ English machine translation).

Chinese Office Action for corresponding CN Application No. 202180025420.3, Jun. 17, 2025 (w/ English machine translation).

* cited by examiner

LEAD BLOCK AND ROTARY CONNECTOR DEVICE

CROSS-REFERENCE TO RELATED APPLICATIONS

The present application is a continuation application of International Application No. PCT/JP2021/005772, filed Feb. 16, 2021, which claims priority to Japanese Patent Application No. 2020-063104 filed Mar. 31, 2020. The contents of these applications are incorporated herein by reference in their entirety.

BACKGROUND

Technical Field

The technology disclosed in the present application relates to a lead block and a rotary connector device.

Background Art

Japanese Unexamined Patent Publications JP 10-144371 A, JP 2003-022879 A and JP 2003-045598 A and International Publication WO 2018/047581 describe a rotary connector device including a lead block.

SUMMARY

According to one aspect, a lead block includes a lead block body and a plurality of busbars. The lead block body includes an electrical insulating material. The plurality of busbars is each partially embedded in the lead block body and includes an electrically conductive material. The plurality of busbars includes a plurality of exposed portions exposed from the lead block body. The plurality of exposed portions respectively corresponds to the plurality of busbars. The plurality of exposed portions each extends in a longitudinal direction and disposed spaced apart from one another in an arrangement direction orthogonal to the longitudinal direction. The plurality of exposed portions includes at least one first exposed portion. The at least one first exposed portion includes a first surface and a first additional surface disposed on a reverse side of the first surface in the arrangement direction. The first surface includes a first cut surface having an area smaller than an area of the first surface. The first additional surface includes a first additional cut surface having an area smaller than an area of the first additional surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
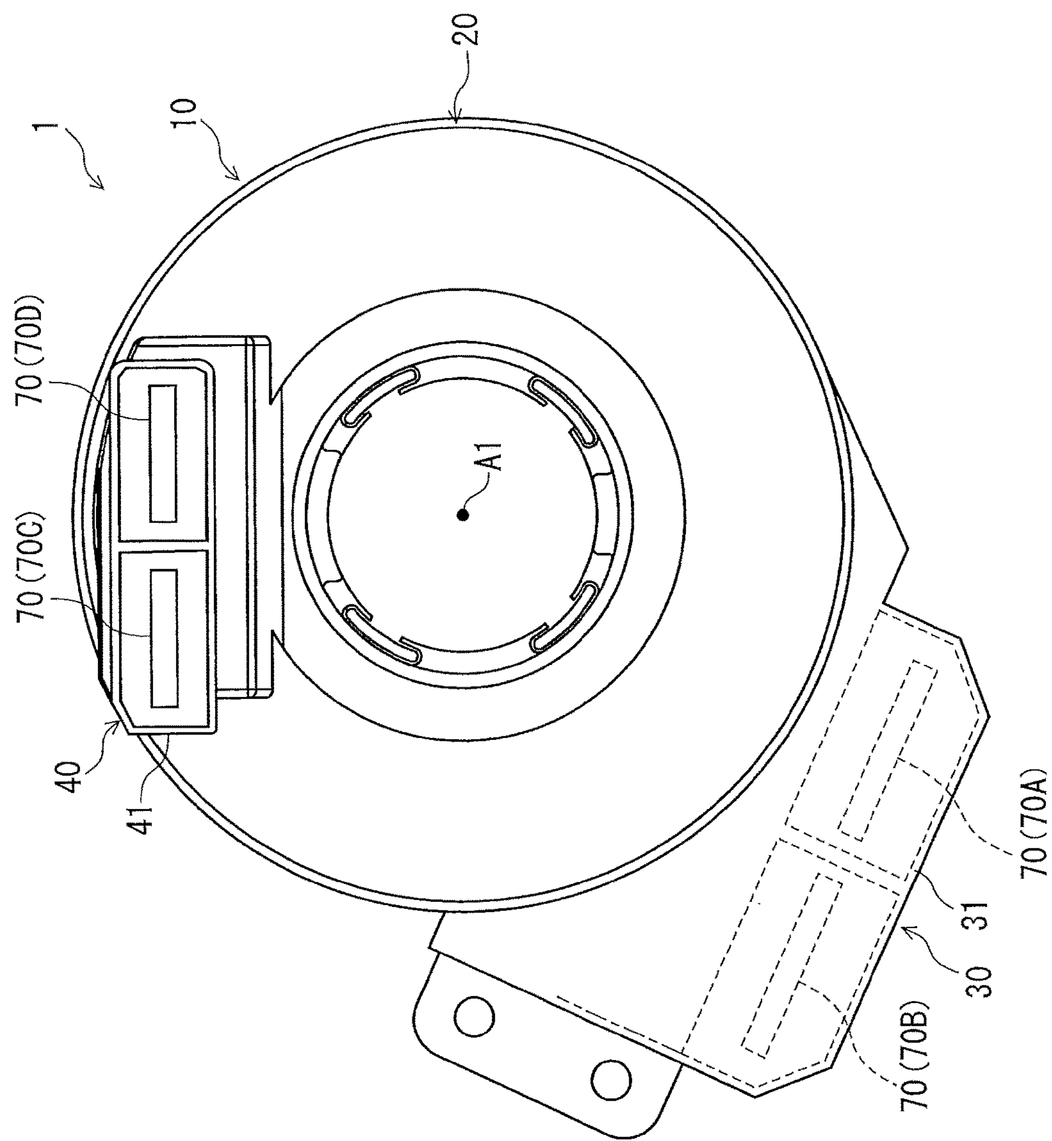
FIG. 1 is a plan view of a rotary connector device according to the present embodiment.

Hereinafter, embodiments will be described with reference to the drawings. In the drawings, the same reference signs denote corresponding or identical components.

As illustrated in FIG. 1, a rotary connector device 1 according to the present embodiment includes a stator 10 and a rotator 20. The stator 10 is configured to be mounted in a vehicle body. The rotator 20 is provided rotatably about a rotation axis A1 relative to the stator 10. The rotator 20 is configured to be fixed to a steering wheel. The rotary connector device 1 includes a first connector 30 and a second connector 40. The first connector 30 is provided on the stator 10. The second connector 40 is provided on the rotator 20.

The first connector 30 is configured with a vehicle body side connector detachably installed on the first connector 30. The first connector 30 includes a first connector housing portion 31 into which the vehicle body side connector is inserted. The vehicle body side connector is electrically connected to an electric circuit such as a control device. The second connector 40 is configured with a steering side connector detachably installed on the second connector 40. The second connector 40 includes a second connector housing portion 41 into which the steering side connector is inserted. The steering side connector is electrically connected to electric circuits such as switches for the steering wheel and an airbag device.

Figure 2:
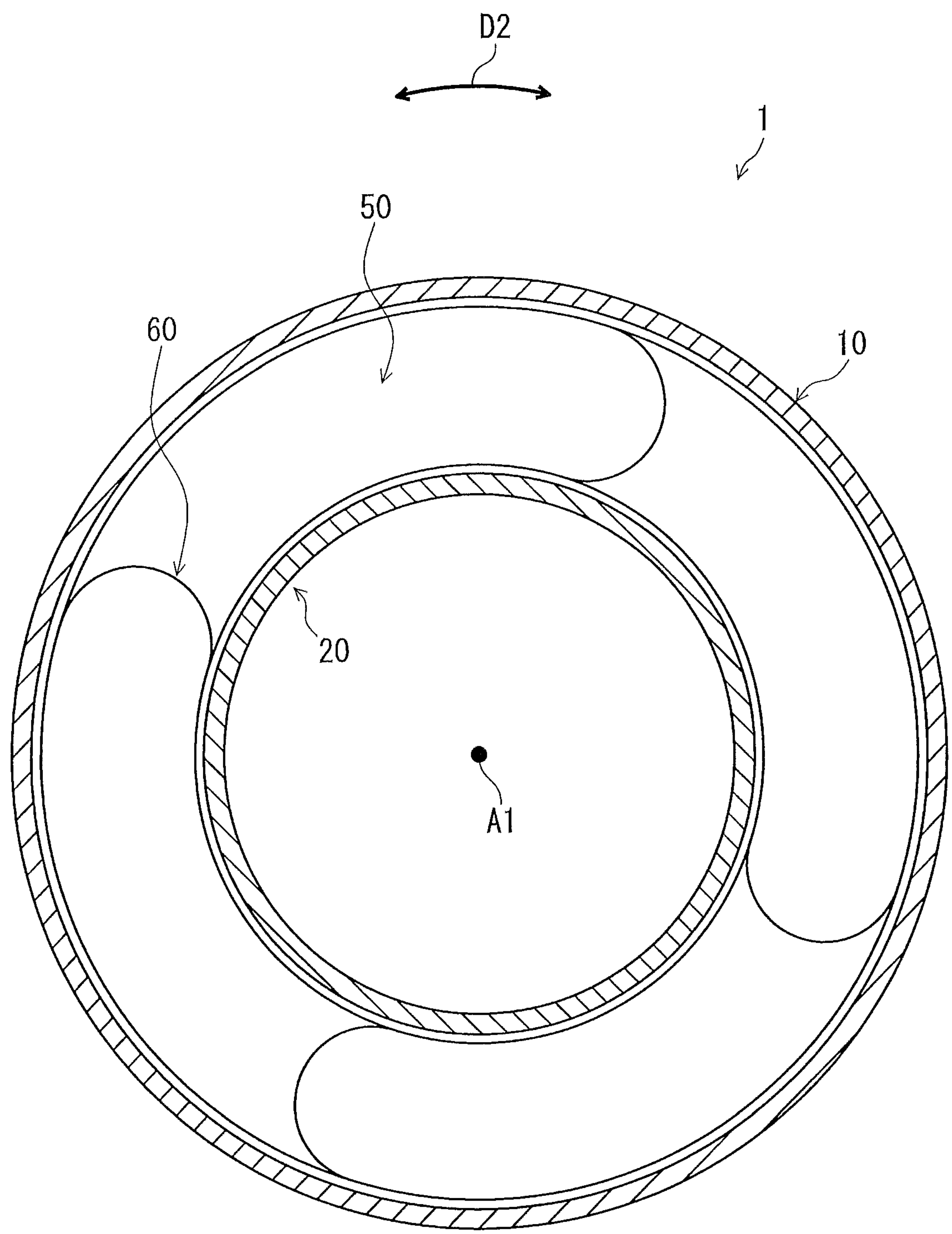
FIG. 2 is a cross-sectional view of the rotary connector device illustrated in FIG. 1.

As illustrated in FIG. 2, the stator 10 and the rotator 20 define a cable housing space 50 between the stator 10 and the rotator 20, the cable housing space 50 provided surrounding the rotation axis A1. For example, the cable housing space 50 is annular and extends in a circumferential direction D2 relative to the rotation axis A1. The rotary connector device 1 includes an electrical cable 60. The electrical cable 60 electrically connects the first connector 30 to the second connector 40. The electrical cable 60 is housed in the cable housing space 50. The electrical cable 60 is flexible and has a flat shape. The electrical cable 60 may also be referred to as a flexible flat cable.

As illustrated in FIG. 1, the rotary connector device 1 includes a lead block 70. In the present embodiment, the rotary connector device 1 includes a plurality of the lead blocks 70. Lead blocks 70A and 70B of the plurality of lead blocks 70 are attached to the stator 10. The lead blocks 70A and 70B are disposed in the first connector housing portion 31. The lead blocks 70C and 70D of the plurality of lead blocks 70 are attached to the rotator 20. The lead blocks 70C and 70D are disposed in the second connector housing portion 41. The first connector 30 includes lead blocks 70A and 70B. The second connector 40 includes lead blocks 70C and 70D. However, the total number of the lead blocks 70 is not limited to the present embodiment.

Figure 3:
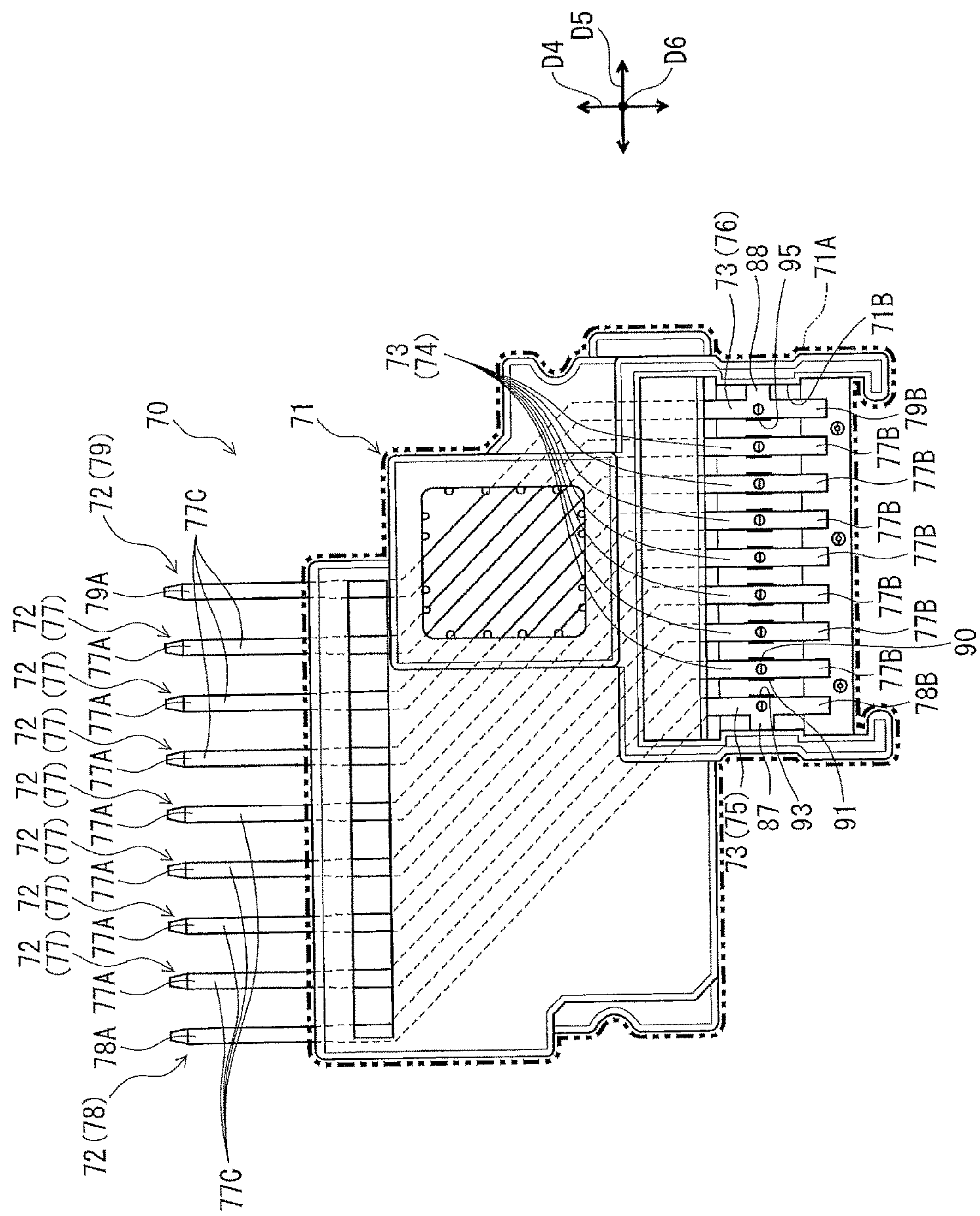
FIG. 3 is a side view of a lead block of the rotary connector device illustrated in FIG. 1.

As illustrated in FIG. 3, the lead block 70 includes a lead block body 71 and a plurality of busbars 72. The lead block body 71 includes an electrical insulating material. The plurality of busbars 72 are each partially embedded in the lead block body 71 and include an electrically conductive material. The electrical insulating material includes, for example, a resin material. The electrically conductive material includes a metal material such as copper, for example. The plurality of busbars 72 are electrically isolated from one another by the lead block body 71. The plurality of busbars 72 are respectively electrically connected to a plurality of wires included in the electrical cable 60 (see FIG. 2).

The plurality of busbars 72 include a plurality of exposed portions 73 exposed from the lead block body 71 and corresponding to the respective plurality of busbars 72. The busbar 72 includes the exposed portion 73. The plurality of exposed portions 73 each extend in a longitudinal direction D4 and are spaced apart from one another in an arrangement direction D5 orthogonal to the longitudinal direction D4.

The plurality of exposed portions 73 include at least one first exposed portion 74. In the present embodiment, the plurality of exposed portions 73 include a plurality of the first exposed portions 74. However, the total number of the first exposed portions 74 is not limited to the present embodiment.

The plurality of exposed portions 73 include a second exposed portion 75. The plurality of exposed portions 73 include a third exposed portion 76. At least one of the first exposed portions 74 is disposed between the second exposed portion 75 and third exposed portion 76 in the arrangement direction D5. The plurality of first exposed portions 74 are disposed between the second exposed portion 75 and the third exposed portion 76 in the arrangement direction D5. The plurality of first exposed portions 74, the second exposed portion 75, and the third exposed portion 76 are spaced apart from one another in the arrangement direction D5.

The plurality of busbars 72 include at least one first busbar 77 that includes the at least one first exposed portion 74. The at least one first busbar 77 includes a first end portion 77A and a first additional end portion 77B. In the present embodiment, the plurality of busbars 72 includes a plurality of the first busbars 77 including the plurality of first exposed portions 74. The plurality of busbars 72 each include the first end portion 77A and the first additional end portion 77B. However, the total number of the first busbars 77 is not limited to the present embodiment.

The plurality of busbars 72 include a second busbar 78 that includes the second exposed portion 75. The plurality of busbars 72 include a third busbar 79 that includes the third exposed portion 76. The second busbar 78 includes a second end portion 78A and a second additional end portion 78B. The third busbar 79 includes a third end portion 79A and a third additional end portion 79B. At least one of the second busbar 78A and the third busbar 79 may be omitted from the plurality of busbars 72.

The first end portion 77A is exposed from the lead block body 71. The first busbar 77 includes a first pin terminal 77C that is exposed from the lead block body 71. The first pin terminal 77C protrudes from the lead block body 71 in the longitudinal direction D4. The first pin terminal 77C includes the first end portion 77A. As viewed in an orthogonal direction D6 orthogonal to the longitudinal direction D4 and the arrangement direction D5, the first end portion 77A is disposed outside a contour 71A of the lead block body 71.

On the other hand, as viewed in the orthogonal direction D6 orthogonal to the longitudinal direction D4 and the arrangement direction D5, the first additional end portion 77B is disposed inside the contour of the lead block body 71. The first additional end portion 77B is at least partially embedded in the lead block body 71. In the present embodiment, the first additional end portion 77B is partially embedded in the lead block body 71, but a portion of the surface of the first additional end portion 77B is exposed from the lead block body 71. However, the entirety of first additional end portion 77B may be embedded in the lead block body 71.

Figure 4:
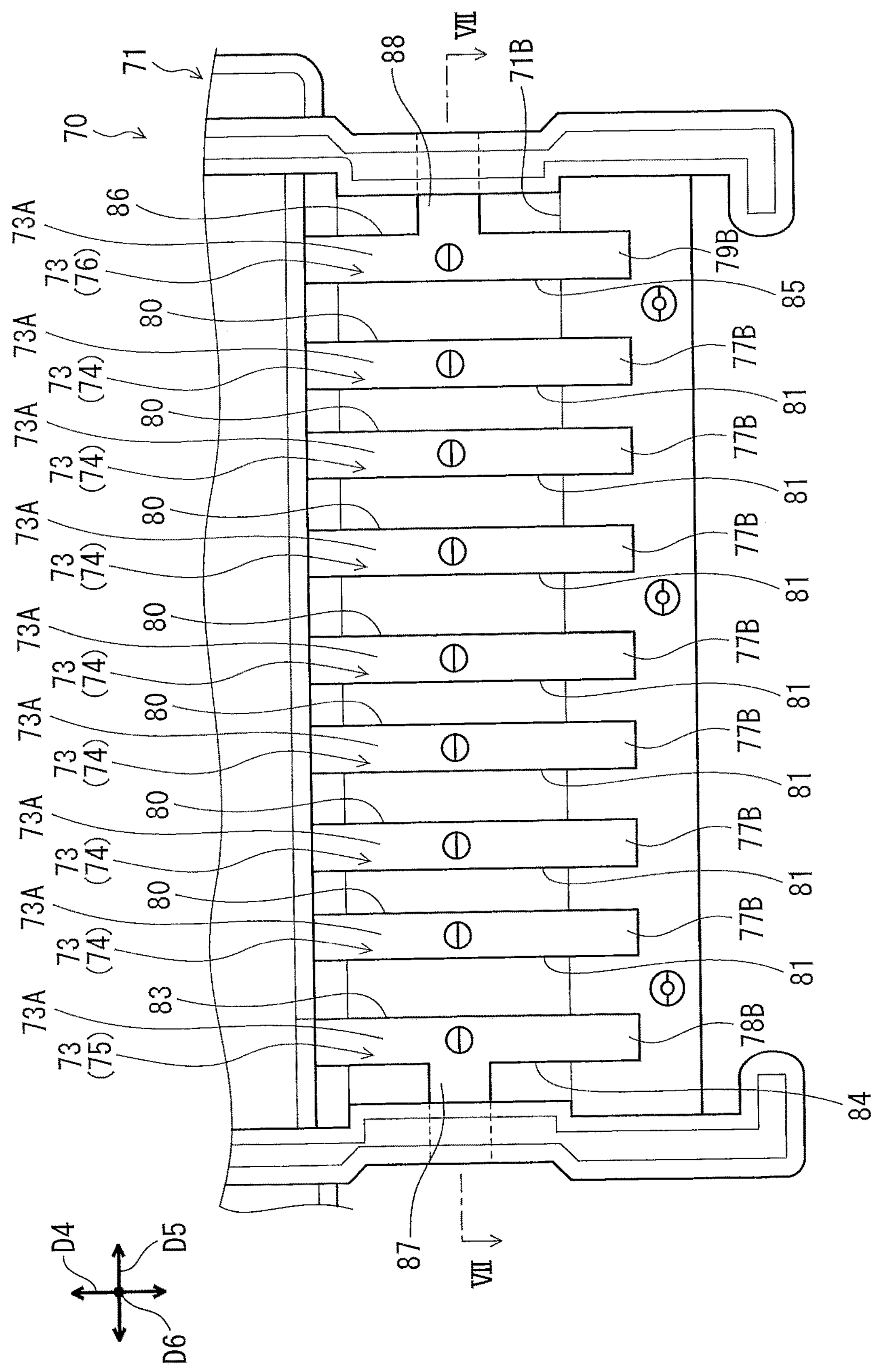
FIG. 4 is a partial side view of the lead block illustrated in FIG. 3.

As illustrated in FIG. 4, the at least one first exposed portion 74 includes a first surface 80 and a first additional surface 81. The first additional surface 81 is disposed on the reverse side of the first surface 80 in the arrangement direction D5. Each of the plurality of first exposed portions 74 includes the first surface 80 and the first additional surface 81.

The second exposed portion 75 includes a second surface 83 and a second additional surface 84. The second surface 83 faces toward the at least one first exposed portions 74 in the arrangement direction D5. The second additional surface 84 is disposed on the reverse side of the second surface 83 in the arrangement direction D5.

The third exposed portion 76 includes a third surface 85 and a third additional surface 86. The third surface 85 faces toward the at least one first exposed portion 74 in the arrangement direction D5. The third additional surface 86 is disposed on the reverse side of the third surface 85 in the arrangement direction D5.

One of the plurality of busbars 72 includes a first protruding portion 87 protruding from the second additional surface 84 of the second exposed portion 75 in the arrangement direction D5. The second busbar 78 includes the first protruding portion 87. The first protruding portion 87 is at least partially embedded in the lead block body 71. In the present embodiment, the first protruding portion 87 is partially embedded in the lead block body 71. However, the entirety of first protruding portion 87 may be embedded in the lead block body 71. Additionally, the first protruding portion 87 may be omitted from the plurality of busbars 72.

One of the plurality of busbars 72 includes a second protruding portion 88 protruding from the third additional surface 86 of the third exposed portion 76 in the arrangement direction D5. The third busbar 79 includes the second protruding portion 88. The second protruding portion 88 is at least partially embedded in the lead block body 71. In the present embodiment, the second protruding portion 88 is partially embedded in the lead block body 71. However, the entirety of second protruding portion 88 may be embedded in the lead block body 71. Additionally, the second protruding portion 88 may be omitted from the plurality of busbars 72.

The lead block body 71 includes an opening 71B. The plurality of exposed portions 73 are at least partially disposed within the opening 71B as viewed in the orthogonal direction D6. The plurality of first exposed portions 74, the second exposed portion 75, and the third exposed portion 76 are disposed at least partially within the opening 71B as viewed in the orthogonal direction D6.

Figure 5:
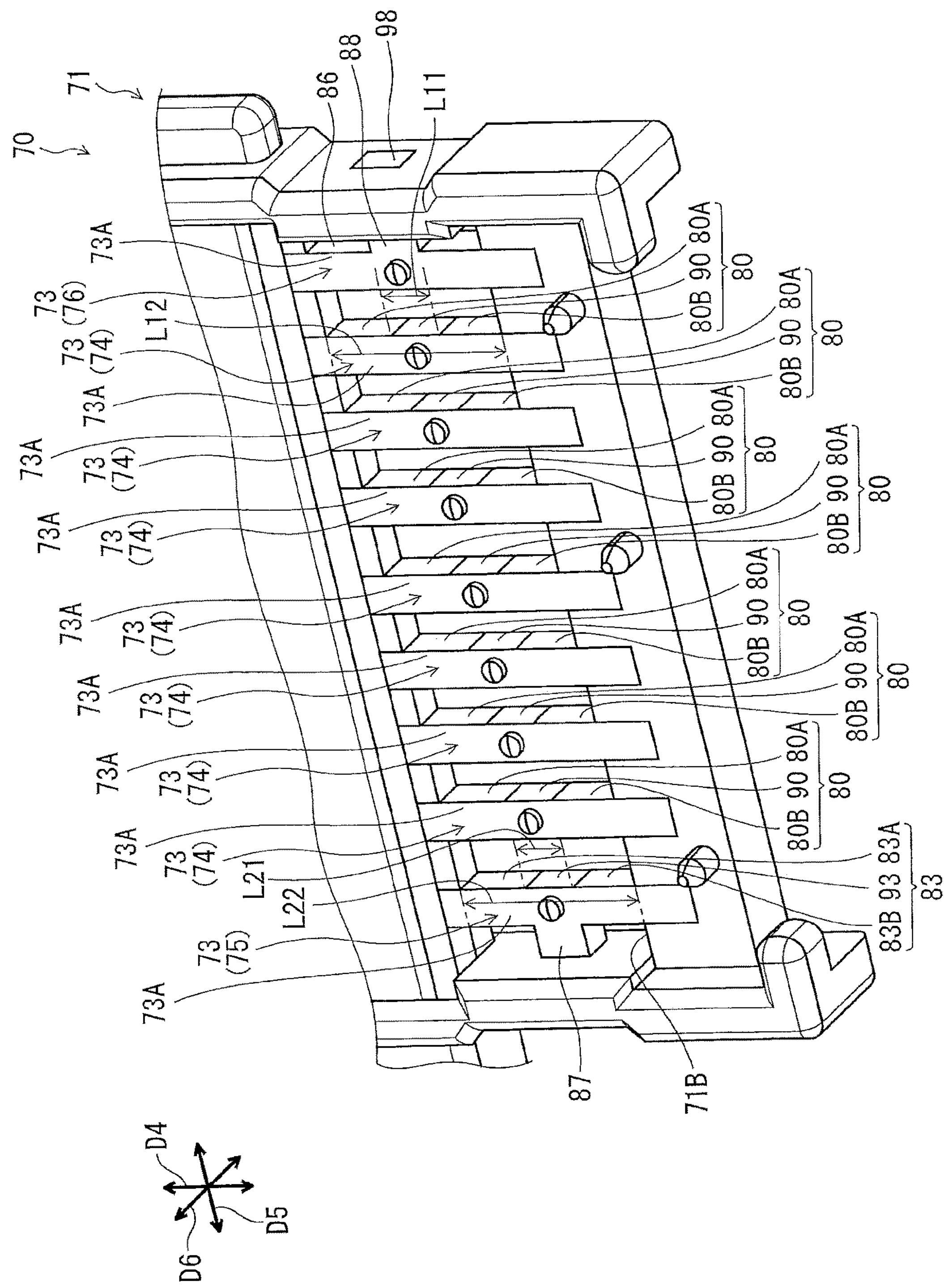
FIG. 5 is a partial perspective view of the lead block illustrated in FIG. 3.

As illustrated in FIG. 5, the first surface 80 includes a first cut surface 90 having an area smaller than an area of the first surface 80. The first cut surface 90 is disposed within the opening 71B. A length L11 of the first cut surface 90 in the longitudinal direction D4 is shorter than a length L12 of the first surface 80 in the longitudinal direction D4. The first surface 80 includes a first adjacent surface 80A adjacent to the first cut surface 90. The first surface 80 includes a first adjacent surface 80B adjacent to the first cut surface 90. The appearance of the first cut surface 90 differs from the appearance of the first adjacent surface 80A. The appearance of the first cut surface 90 differs from the appearance of the first adjacent surface 80B. The appearance of the first adjacent surface 80A is the same as the appearance of the first adjacent surface 80B.

As described below, the first cut surface 90 is a surface formed when a connector bar 104 (see FIGS. 9 to 11) is cut off from the plurality of first exposed portions 74 during manufacture of the lead block 70. The first adjacent surfaces 80A and 80B are surfaces formed by, for example, press machining (e.g., shearing), while the first cut surface 90 is a surface formed in a step different from and later than a step for forming the first adjacent surfaces 80A and 80B. The first cut surface 90 is, for example, a surface formed by press machining (e.g., shearing) similarly to the first adjacent surfaces 80A and 80B.

Figure 12:
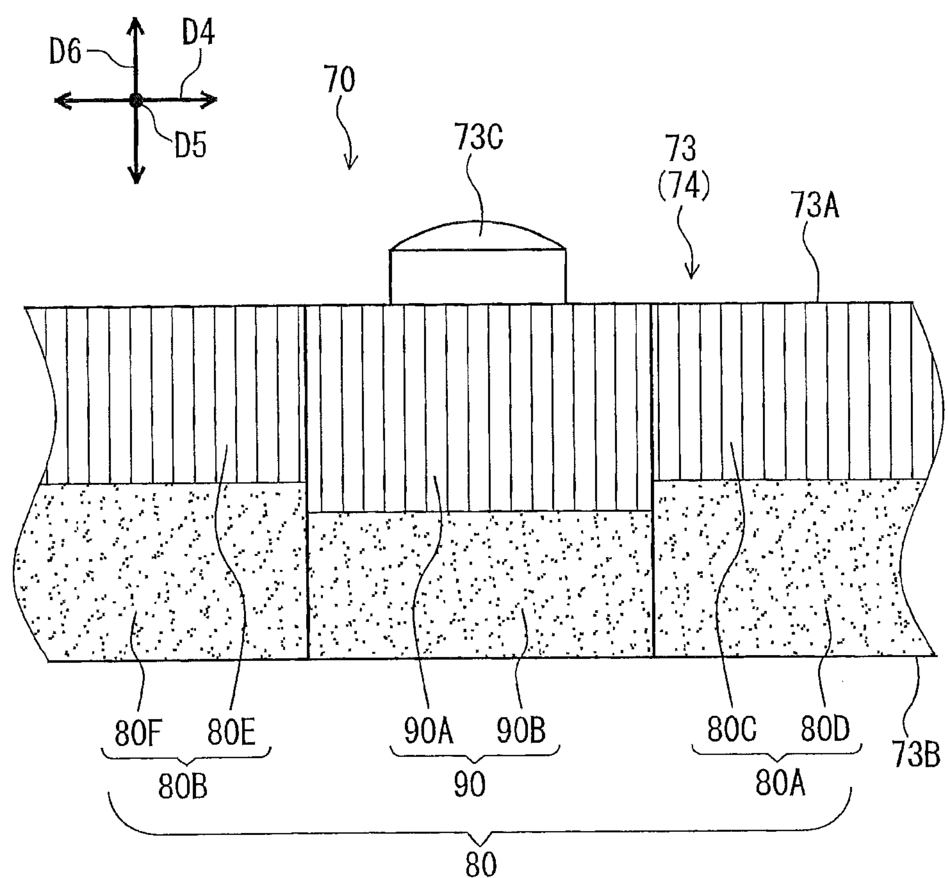
FIG. 12 is a view illustrating a surface state of a first surface of the lead block illustrated in FIG. 3.

As illustrated in FIG. 12, the first adjacent surface 80A includes a shear surface 80C and a fracture surface 80D. The fracture surface 80D is adjacent to the shear surface 80C in the orthogonal direction D6. The shear surface 80C is a surface formed during shearing by shearing a material using a punch and a die, and includes a plurality of streaks extending in one direction (e.g., the orthogonal direction D6). The fracture surface 80D is a surface formed during shearing by fracturing of the material after shearing of a portion of the material using the punch and die, and includes fine recesses and protruding portions. Thus, the appearance of the shear surface 80C differs from the appearance of the fracture surface 80D.

Similarly, the first adjacent surface 80B includes a shear surface 80E and a fracture surface 80F. The fracture surface 80F is adjacent to the shear surface 80E in the orthogonal direction D6. The shear surface 80E is a surface formed during shearing by shearing of the material using the punch and die, and includes a plurality of streaks extending in one direction (e.g., the orthogonal direction D6). The fracture surface 80F is a surface formed during shearing by fracturing of the material after shearing of a portion of the material using the punch and die, and includes fine recesses and protruding portions. Thus, the appearance of the shear surface 80E differs from the appearance of the fracture surface 80F.

The first cut surface 90 includes a first shear surface 90A and a first fracture surface 90B. The first fracture surface 90B is adjacent to the first shear surface 90A in the orthogonal direction D6. The first shear surface 90A is a surface formed during shearing by shearing of the material using the punch and die, and includes a plurality of streaks extending in one direction (e.g., the orthogonal direction D6). The first fracture surface 90B is a surface formed during shearing by fracturing of the material after shearing of a portion of the material using the punch and die, and includes fine recesses and protruding portions. Thus, the appearance of the first shear surface 90A differs from the appearance of the first fracture surface 90B.

As illustrated in FIG. 12, the length of the first shear surface 90A in the orthogonal direction D6 differs from the length of the shear surfaces 80C and 80E in the orthogonal direction D6. The length of the first fracture surface 90B in the orthogonal direction D6 differs from the length of the fracture surfaces 80D and 80F in the orthogonal direction D6. Accordingly, the appearance of the first cut surface 90 differs from the appearance of the first adjacent surfaces 80A and 80B. Note that the first cut surface 90 may be a surface subjected to surface finish after the connector bar 104 is cut off from the plurality of first exposed portions 74. Similarly, the first adjacent surfaces 80A and 80B may be a surface subjected to surface finish. In a case where the first cut surface 90 is subjected to surface finish, the first shear surface 90A and the first fracture surface 90B are at least partially replaced with finished surfaces. In a case where the first adjacent surface 80A is subjected to surface finish, the shear surface 80C and the fracture surface 80D are at least partially replaced with finished surfaces. In a case where the first adjacent surface 80B is subjected to surface finish, the shear surface 80E and the fracture surface 80F are at least partially replaced with finished surfaces. Accordingly, the appearance of the first cut surface 90 may be the same as the appearance of the first adjacent surfaces 80A and 80B.

Figure 6:
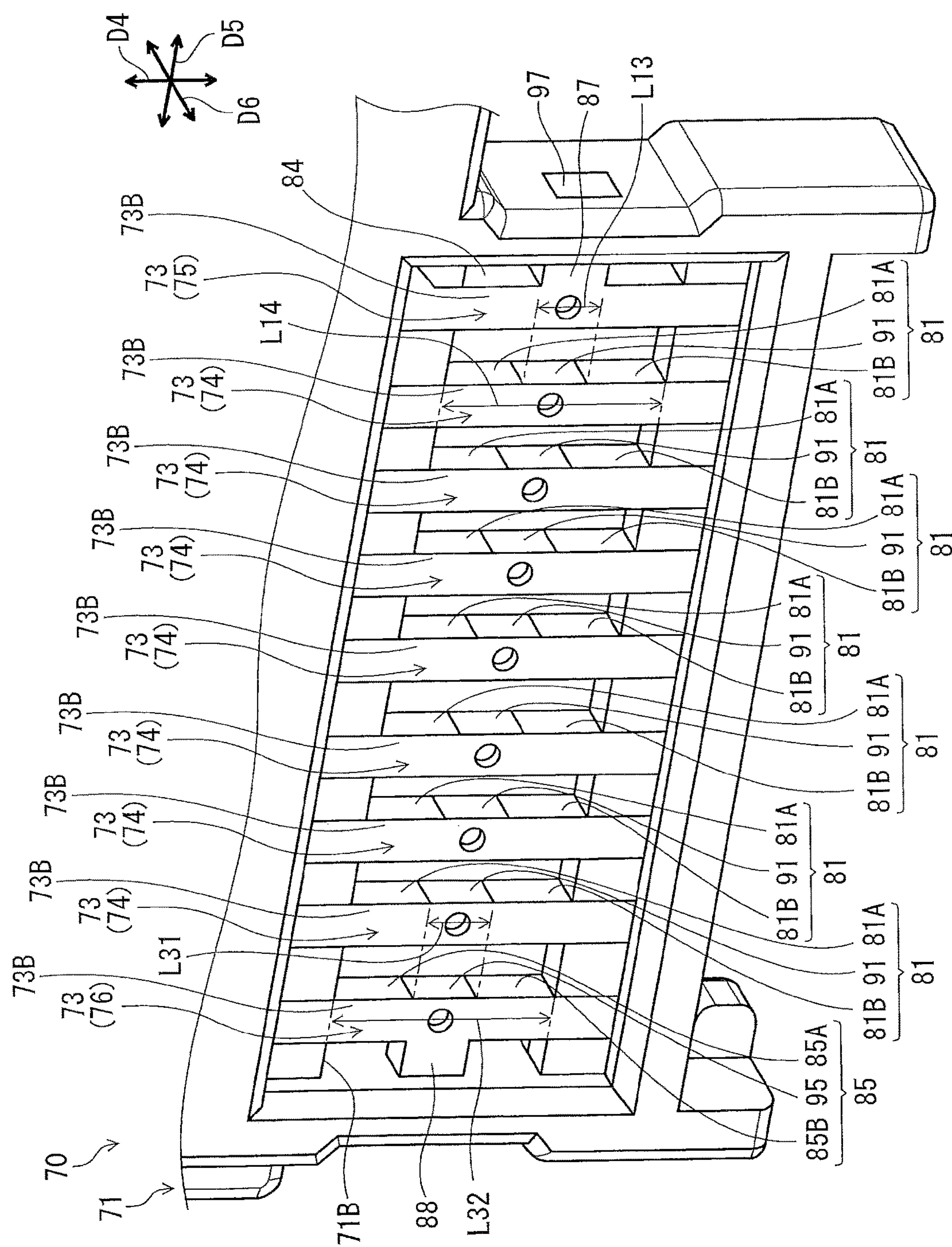
FIG. 6 is a partial perspective view of the lead block illustrated in FIG. 3.

As illustrated in FIG. 6, the first additional surface 81 includes a first additional cut surface 91 having an area smaller than an area of the first additional surface 81. The first additional cut surface 91 is disposed within the opening 71B. A length L13 of the first additional cut surface 91 in the longitudinal direction D4 is shorter than a length L14 of the first additional surface 81 in the longitudinal direction D4. The first additional surface 81 includes a first additional adjacent surface 81A adjacent to the first additional cut surface 91. The first additional surface 81 includes a first additional adjacent surface 81B adjacent to the first additional cut surface 91. The appearance of the first additional cut surface 91 differs from the appearance of the first additional adjacent surface 81A. The appearance of the first additional cut surface 91 differs from the appearance of the first additional adjacent surface 81B. The appearance of the first additional adjacent surface 81A is the same as the appearance of the first additional adjacent surface 81B.

The first additional cut surface 91 is disposed on the reverse side of the first cut surface 90 (see FIG. 5) in the arrangement direction D5. The first additional cut surface 91 is disposed at the same position as that of the first cut surface 90 in the longitudinal direction D4 (see FIG. 5). However, the first additional cut surface 91 need not be located on the reverse side of the first cut surface 90 (see FIG. 5) in the arrangement direction D5. The first additional cut surface 91 may be offset from the first cut surface 90 (see FIG. 5) in the longitudinal direction D4.

As described below, the first additional cut surface 91 is a surface formed when the connector bar 104 (see FIGS. 9 to 11) is cut off from the plurality of first exposed portions 74 during manufacture of the lead block 70. The first additional adjacent surfaces 81A and 81B are surfaces formed by, for example, press machining (e.g., shearing), whereas the first additional cut surface 91 is a surface formed in a step different from and later than a step for forming the first additional adjacent surfaces 81A and 81B. The first additional cut surface 91 is, for example, a surface formed by press machining (e.g., shearing) similarly to the first additional adjacent surfaces 81A and 81B.

Figure 13:
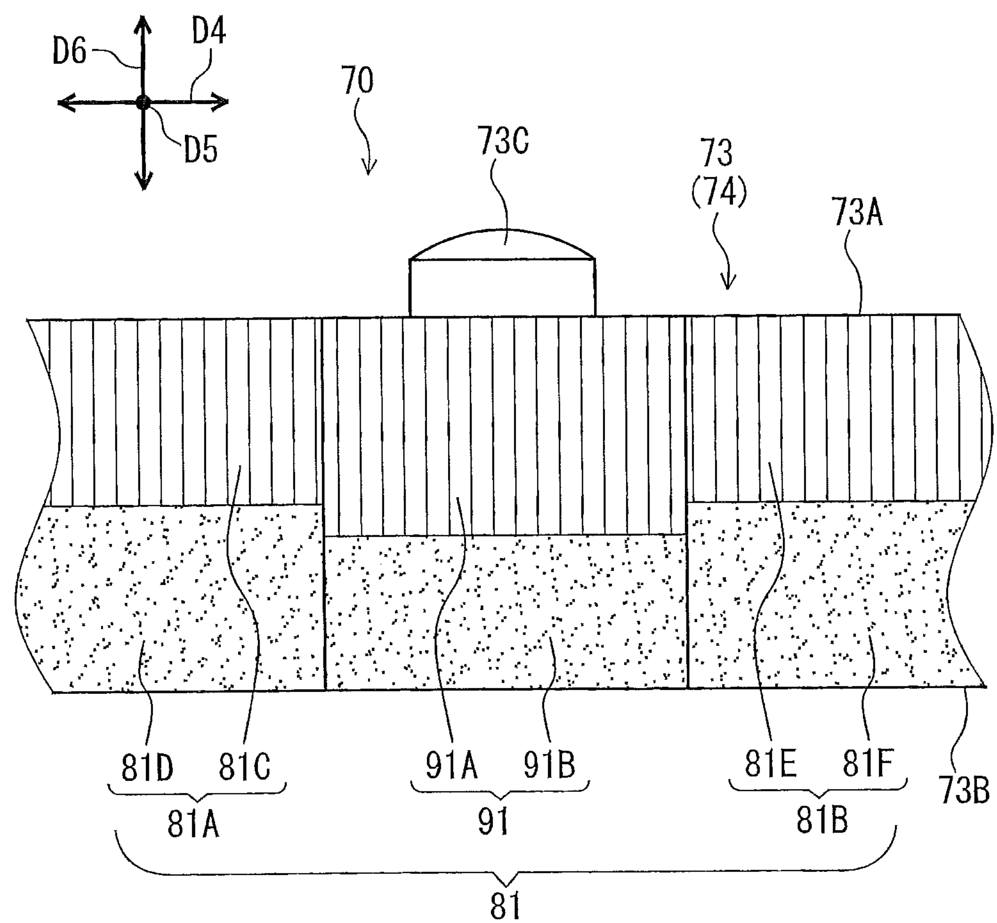
FIG. 13 is a diagram illustrating a surface state of a first additional surface of the lead block illustrated in FIG. 3.

As illustrated in FIG. 13, the first additional adjacent surface 81A includes an additional shear surface 81C and an additional fracture surface 81D. The additional fracture surface 81D is adjacent to the additional shear surface 81C in the orthogonal direction D6. The additional shear surface 81C is a surface formed during shearing by shearing of the material using the punch and die, and includes a plurality of streaks extending in one direction (e.g., the orthogonal direction D6). The additional fracture surface 81D is a surface formed during shearing by fracturing of the material after shearing of a portion of the material using the punch and die, and includes fine recesses and protruding portions. Thus, the appearance of the additional shear surface 81C differs from the appearance of the additional fracture surface 81D.

Similarly, the first additional adjacent surface 81B includes an additional shear surface 81E and an additional fracture surface 81F. The additional fracture surface 81F is adjacent to the additional shear surface 81E in the orthogonal direction D6. The additional shear surface 81E is a surface formed during shearing by shearing of the material using the punch and die, and includes a plurality of streaks extending in one direction (e.g., the orthogonal direction D6). The additional fracture surface 81F is a surface formed during shearing by fracturing of the material after shearing of a portion of the material using the punch and die, and includes fine recesses and protruding portions. Thus, the appearance of the additional shear surface 81E differs from the appearance of the additional fracture surface 81F.

The first additional cut surface 91 includes a first additional shear surface 91A and a first additional fracture surface 91B. The first additional fracture surface 91B is adjacent to the first additional shear surface 91A in the orthogonal direction D6. The first additional shear surface 91A is a surface formed during shearing by shearing of the material using the punch and die, and includes a plurality of streaks extending in one direction (e.g., the orthogonal direction D6). The first additional fracture surface 91B is a surface formed during shearing by fracturing of the material after shearing of a portion of the material using the punch and die, and includes fine recesses and protruding portions. Thus, the appearance of the first additional shear surface 91A differs from the appearance of the first additional fracture surface 91B.

As illustrated in FIG. 13, the length of the first additional shear surface 91A in the orthogonal direction D6 differs from the length of the additional shear surfaces 81C and 81E in the orthogonal direction D6. The length of the first additional fracture surface 91B in the orthogonal direction D6 differs from the length of the additional fracture surfaces 81D and 81F in the orthogonal direction D6. Accordingly, the appearance of the first additional cut surface 91 differs from the appearance of the first additional adjacent surfaces 81A and 81B. Note that the first additional cut surface 91 may be a surface subjected to surface finish after the connector bar 104 is cut off from the plurality of first exposed portions 74. Similarly, the first additional adjacent surfaces 81A and 81B may be surfaces subjected to surface finish. In a case where the first additional cut surface 91 is subjected to surface finish, the first additional shear surface 91A and the first additional fracture surface 91B are at least partially replaced with finished surfaces. In a case where the first additional adjacent surface 81A is subjected to surface finish, the additional shear surface 81C and the additional fracture surface 81D are at least partially replaced with finished surfaces. In a case where the first additional adjacent surface 81B is subjected to surface finish, the additional shear surface 81E and the additional fracture surface 81F are at least partially replaced with finished surfaces. Accordingly, the appearance of the first additional cut surface 91 may be the same as the appearance of the first additional adjacent surfaces 81A and 81B.

As illustrated in FIG. 5, the second surface 83 includes a second cut surface 93 having an area smaller than an area of the second surface 83. The second cut surface 93 is disposed within the opening 71B. A length L21 of the second cut surface 93 in the longitudinal direction D4 is shorter than a length L22 of the second surface 83 in the longitudinal direction D4. The second surface 83 includes second adjacent surfaces 83A and 83B adjacent to the second cut surface 93. The appearance of the second cut surface 93 differs from the appearance of each of the second adjacent surfaces 83A and 83B. The appearance of the second adjacent surface 83A is the same as the appearance of the second adjacent surface 83B.

As described below, the second cut surface 93 is a surface formed when the connector bar 104 (see FIGS. 9 to 11) is cut off from the plurality of first exposed portions 74 during manufacture of the lead block 70. The second adjacent surfaces 83A and 83B are surfaces formed by, for example, press machining (e.g., shearing), while the second cut surface 93 is a surface formed in a step different from and later than a step for forming the second adjacent surfaces 83A and 83B. The second cut surface 93 is, for example, a surface formed by press machining (e.g., shearing) similarly to the second adjacent surfaces 83A and 83B.

Figure 14:
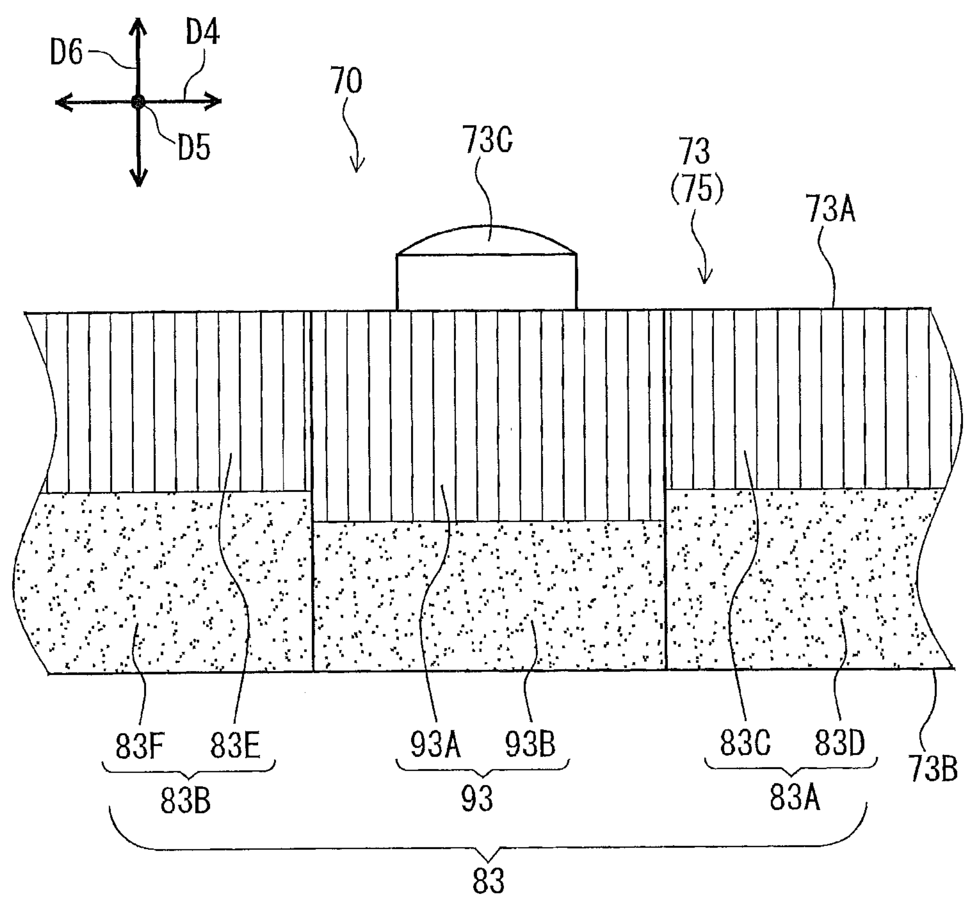
FIG. 14 is a diagram illustrating a surface state of a second surface of the lead block illustrated in FIG. 3.

As illustrated in FIG. 14, the second adjacent surface 83A includes a shear surface 83C and a fracture surface 83D. The fracture surface 83D is adjacent to the shear surface 83C in the orthogonal direction D6. The shear surface 83C is a surface formed during shearing by shearing of the material using the punch and die, and includes a plurality of streaks extending in one direction (e.g., the orthogonal direction D6). The fracture surface 83D is a surface formed during shearing by fracturing of the material after shearing of a portion of the material using the punch and die, and includes fine recesses and protruding portions. Thus, the appearance of the shear surface 83C differs from the appearance of the fracture surface 83D.

Similarly, the second adjacent surface 83B includes a shear surface 83E and a fracture surface 83F. The fracture surface 83F is adjacent to the shear surface 83E in the orthogonal direction D6. The shear surface 83E is a surface formed during shearing by shearing of the material using the punch and die, and includes a plurality of streaks extending in one direction (e.g., the orthogonal direction D6). The fracture surface 83F is a surface formed during shearing by fracturing of the material after shearing of a portion of the material using the punch and die, and includes fine recesses and protruding portions. Thus, the appearance of the shear surface 83E differs from the appearance of the fracture surface 83F.

The second cut surface 93 includes a second shear surface 93A and a second fracture surface 93B. The second fracture surface 93B is adjacent to the second shear surface 93A in the orthogonal direction D6. The second shear surface 93A is a surface formed during shearing by shearing of the material using the punch and die, and includes a plurality of streaks extending in one direction (e.g., the orthogonal direction D6). The second fracture surface 93B is a surface formed during shearing by fracturing of the material after shearing of a portion of the material using the punch and die, and includes fine recesses and protruding portions. Thus, the appearance of the second shear surface 93A differs from the appearance of the second fracture surface 93B.

As illustrated in FIG. 14, the length of the second shear surface 93A in the orthogonal direction D6 differs from the length of the shear surfaces 83C and 83E in the orthogonal direction D6. The length of the second fracture surface 93B in the orthogonal direction D6 differs from the length of the fracture surfaces 83D and 83F in the orthogonal direction D6. Thus, the appearance of the second cut surface 93 differs from the appearance of the second adjacent surfaces 83A and 83B. Note that the second cut surface 93 may be a surface subjected to surface finish after the connector bar 104 is cut off from the plurality of first exposed portions 74. Similarly, the second adjacent surfaces 83A and 83B may be surfaces subjected to surface finish. In a case where the second cut surface 93 is subjected to surface finish, the second shear surface 93A and the second fracture surface 93B are at least partially replaced with finished surfaces. In a case where the second adjacent surface 83A is subjected to surface finish, the shear surface 83C and the fracture surface 83D are at least partially replaced with finished surfaces. In a case where the second adjacent surface 83B is subjected to surface finish, the shear surface 83E and the fracture surface 83F are at least partially replaced with finished surfaces. Accordingly, the appearance of the second cut surface 93 may be the same as the appearance of the second adjacent surfaces 83A and 83B.

As illustrated in FIG. 6, the third surface 85 includes a third cut surface 95 having an area smaller than an area of the third surface 85. The third cut surface 95 is disposed within the opening 71B. A length L31 of the third cut surface 95 in the longitudinal direction D4 is shorter than a length L32 of the third surface 85 in the longitudinal direction D4. The third surface 85 includes third adjacent surfaces 85A and 85B adjacent to the third cut surface 95. The appearance of the third cut surface 95 differs from the appearance of each of the third adjacent surfaces 85A and 85B. The appearance of the third adjacent surface 85A is the same as the appearance of the third adjacent surface 85B.

As described below, the third cut surface 95 is a surface formed when the connector bar 104 (see FIGS. 9 to 11) is cut off from the plurality of first exposed portions 74 during manufacture of the lead block 70. The third adjacent surfaces 85A and 85B are surfaces formed by, for example, press machining (e.g., shearing), while the third cut surface 95 is a surface formed in a step different from and later than a step for forming the third adjacent surfaces 85A and 85B. The third cut surface 95 is, for example, a surface formed by press machining (e.g., shearing) similarly to the third adjacent surfaces 85A and 85B.

Figure 15:
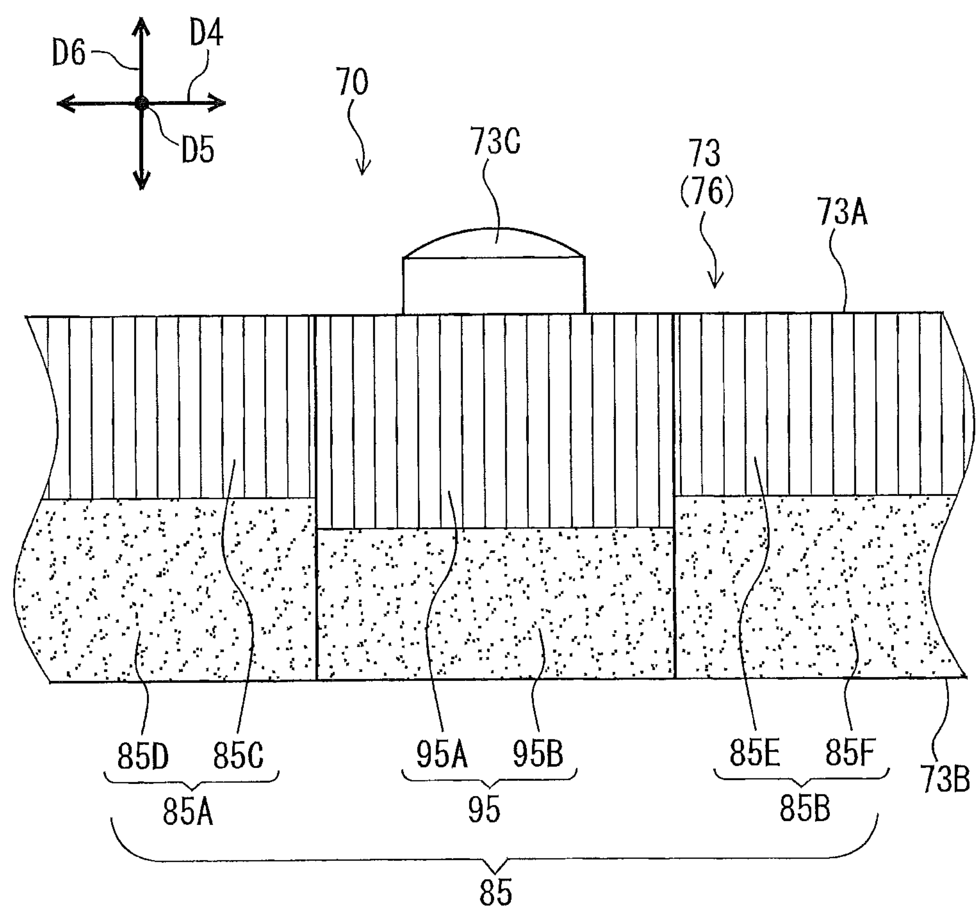
FIG. 15 is a diagram illustrating a surface state of a third surface of the lead block illustrated in FIG. 3.

As illustrated in FIG. 15, the third adjacent surface 85A includes a shear surface 85C and a fracture surface 85D. The fracture surface 85D is adjacent to the shear surface 85C in the orthogonal direction D6. The shear surface 85C is a surface formed during shearing by shearing of the material using the punch and die, and includes a plurality of streaks extending in one direction (e.g., the orthogonal direction D6). The fracture surface 85D is a surface formed during shearing by fracturing of the material after shearing of a portion of the material using the punch and die, and includes fine recesses and protruding portions. Thus, the appearance of the shear surface 85C differs from the appearance of the fracture surface 85D.

Similarly, the third adjacent surface 85B includes a shear surface 85E and a fracture surface 85F. The fracture surface 85F is adjacent to the shear surface 85E in the orthogonal direction D6. The shear surface 85E is a surface formed during shearing by shearing of the material using the punch and die, and includes a plurality of streaks extending in one direction (e.g., the orthogonal direction D6). The fracture surface 85F is a surface formed during shearing by fracturing of the material after shearing of a portion of the material using the punch and die, and includes fine recesses and protruding portions. Thus, the appearance of the shear surface 85E differs from the appearance of the fracture surface 85F.

The third cut surface 95 includes a third shear surface 95A and a third fracture surface 95B. The third fracture surface 95B is adjacent to the third shear surface 95A in the orthogonal direction D6. The third shear surface 95A is a surface formed during shearing by shearing of the material using the punch and die, and includes a plurality of streaks extending in one direction (e.g., the orthogonal direction D6). The third fracture surface 95B is a surface formed during shearing by fracturing of the material after shearing of a portion of the material using the punch and die, and includes fine recesses and protruding portions. Thus, the appearance of the third shear surface 95A differs from the appearance of the third fracture surface 95B.

As illustrated in FIG. 15, the length of the third shear surface 95A in the orthogonal direction D6 differs from the length of the shear surfaces 85C and 85E in the orthogonal direction D6. The length of the third fracture surface 95B in the orthogonal direction D6 differs from the length of the fracture surfaces 85D and 85F in the orthogonal direction D6. Accordingly, the appearance of the third cut surface 95 differs from the appearance of the third adjacent surfaces 85A and 85B. Note that the third cut surface 95 may be a surface subjected to surface finish after the connector bar 104 is cut off from the plurality of first exposed portions 74. Similarly, the third adjacent surfaces 85A and 85B may be surfaces subjected to surface finish. In a case where the third cut surface 95 is subjected to surface finish, the third shear surface 95A and the third fracture surface 95B are at least partially replaced with finished surfaces. In a case where the third adjacent surface 85A is subjected to surface finish, the shear surface 85C and the fracture surface 85D are at least partially replaced with finished surfaces. In a case where the third adjacent surface 85B is subjected to surface finish, the shear surface 85E and the fracture surface 85F are at least partially replaced with finished surfaces. Accordingly, the appearance of the third cut surface 95 may be the same as the appearance of the third adjacent surfaces 85A and 85B.

As illustrated in FIG. 3, in the at least one first busbar 77, the first exposed portion 74 is disposed between the first end portion 77A and the first additional end portion 77B. In the at least one first busbar 77, the first cut surface 90 and the first additional cut surface 91 are disposed between the first end portion 77A and the first additional end portion 77B. In the second busbar 78, the second cut surface 93 is disposed between the second end portion 78A and the second additional end portion 78B. In the third busbar 79, the third cut surface 95 is disposed between the third end portion 79A and the third additional end portion 79B.

As illustrated in FIG. 6, the first protruding portion 87 includes a second additional cut surface 97. The second additional cut surface 97 is an end portion surface of the first protruding portion 87 and is exposed from the lead block body 71. As described below, the second additional cut surface 97 is a surface formed when the connector bar 104 (see FIGS. 9 to 11) is cut off from the first protruding portion 87 during manufacture of the lead block 70.

As illustrated in FIG. 5, the second protruding portion 88 includes a third additional cut surface 98. The third additional cut surface 98 is an end portion surface of the second protruding portion 88 and is exposed from the lead block body 71. As described below, the third additional cut surface 98 is a surface formed when the connector bar 104 (see FIGS. 9 to 11) is cut off from the second protruding portion 88 during manufacture of the lead block 70.

The plurality of exposed portions 73 respectively include a plurality of cable mounting surfaces 73A. The cable mounting surface 73A is disposed facing in the orthogonal direction D6. The plurality of cable mounting surfaces 73A lie opposite to the electrical cable 60 (see FIG. 2) connected to the plurality of busbars 72.

As illustrated in FIG. 6, the plurality of exposed portions 73 respectively include a plurality of back surfaces 73B. The back surface 73B is disposed on the reverse side of the cable mounting surface 73A in the orthogonal direction D6. The back surface 73B is disposed facing in the orthogonal direction D6.

Figure 7:
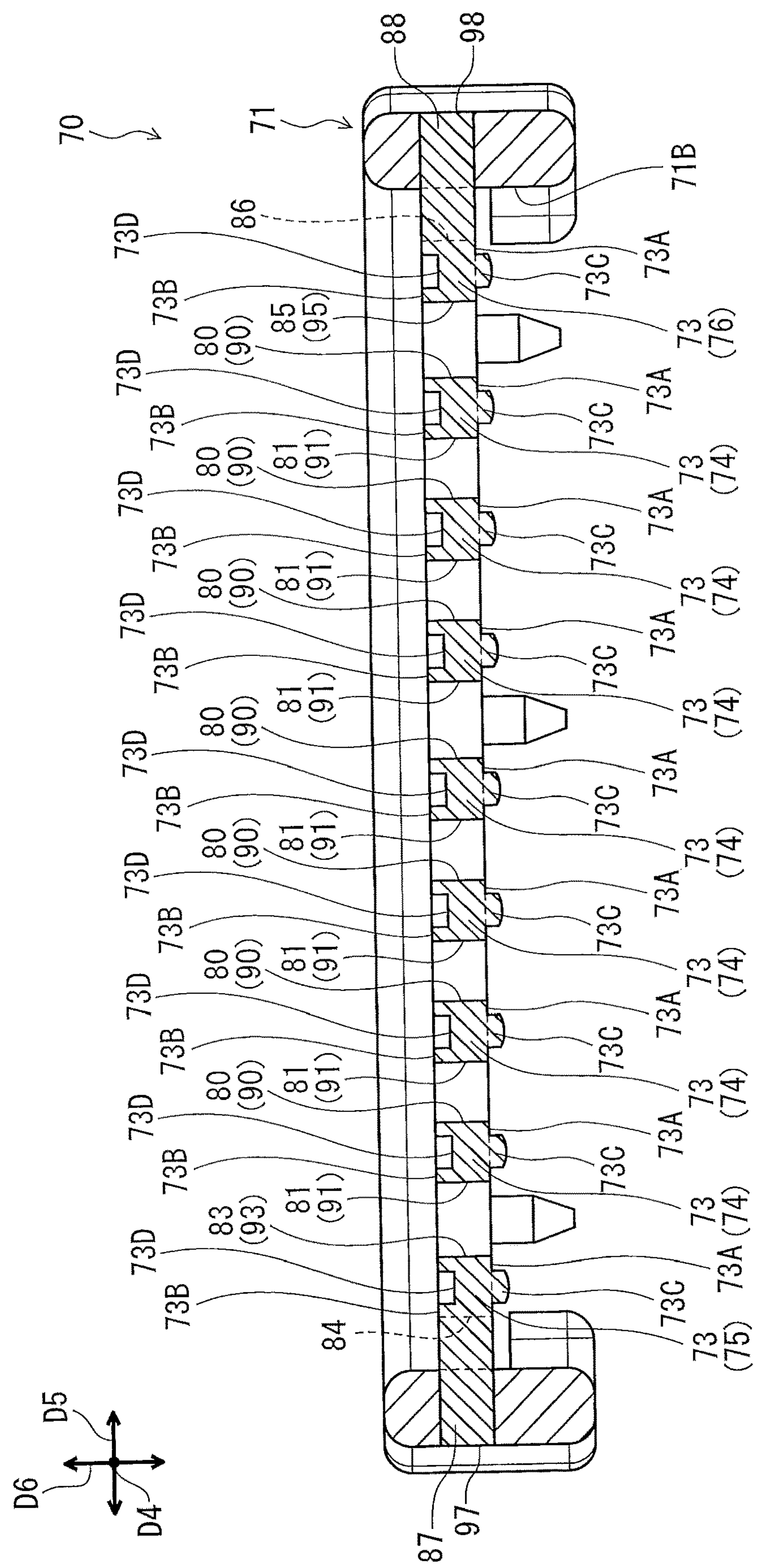
FIG. 7 is a cross-sectional view of the lead block taken along a line VII-VII of FIG. 4.

As illustrated in FIG. 7, the plurality of exposed portions 73 respectively include a plurality of projections 73C. The projection 73C protrudes from the cable mounting surface 73A in the orthogonal direction D6. The plurality of projections 73C are respectively electrically connected to a plurality of wires included in the electrical cable 60 (see FIG. 2). For example, the plurality of projections 73C are connected by a connection method such as ultrasonic bonding or resistance welding with the plurality of wires included in the electrical cable 60 (see FIG. 2).

The plurality of exposed portions 73 respectively include a plurality of recesses 73D. The recess 73D is disposed in the back surface 73B of each of the plurality of exposed portions 73. The recess 73D is disposed on the reverse side of the projection 73C in the orthogonal direction D6. The projection 73C and the recess 73D are formed by, for example, press machining. At least one of the projection 73C and the recess 73D may be omitted from the exposed portion 73.

A method of manufacturing the lead block 70 will be described with reference to FIGS. 8 to 11.

Figure 8:
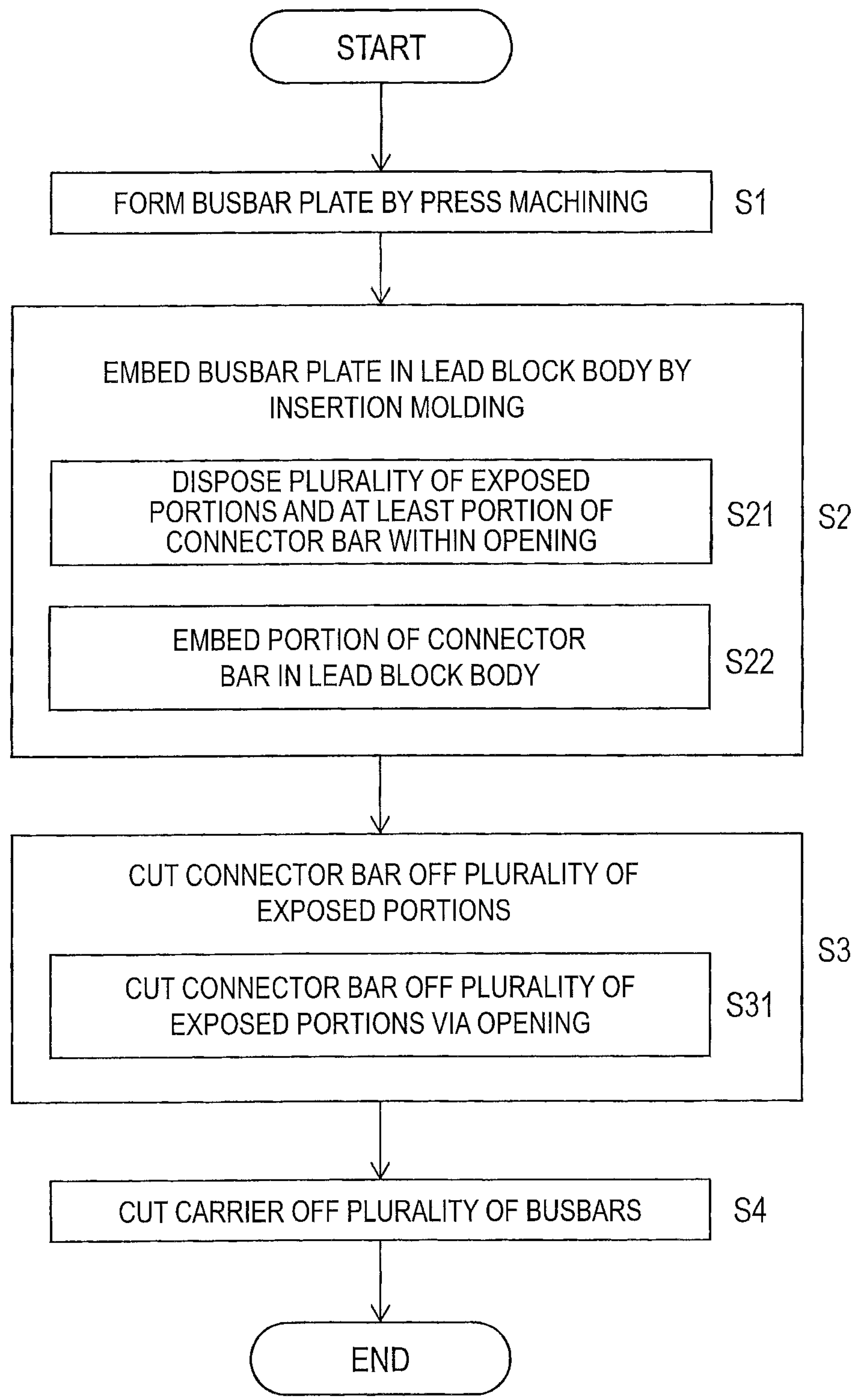
FIG. 8 is a flowchart illustrating a method of manufacturing the lead block illustrated in FIG. 3.
Figure 9:
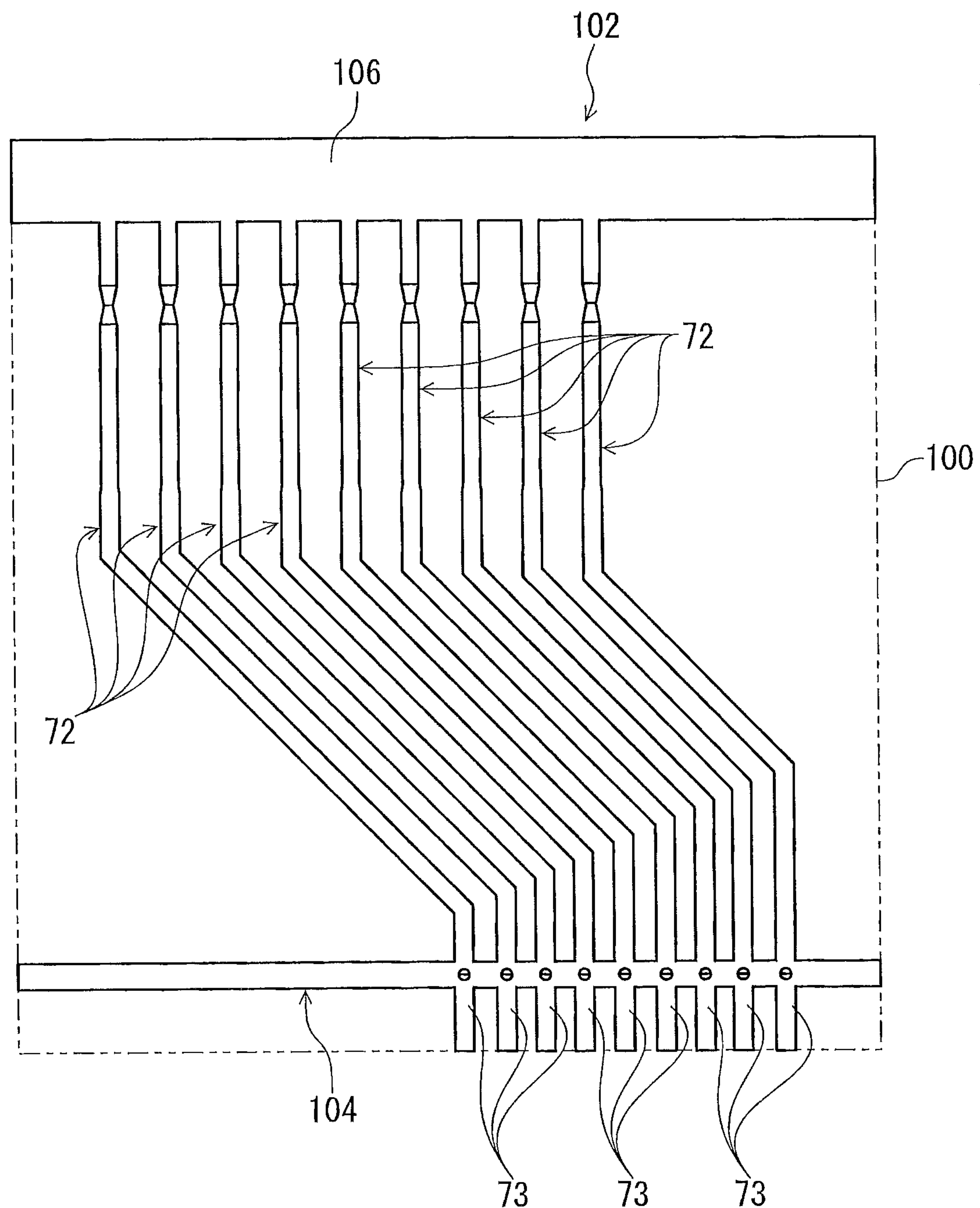
FIG. 9 is a plan view illustrating the press machining step for the lead block illustrated in FIG. 3.

As illustrated in FIGS. 8 and 9, the method of manufacturing the lead block 70 includes the press machining step S1 of forming, by press machining, a busbar plate 102 from a plate 100 including an electrically conductive material. As illustrated in FIG. 9, the busbar plate 102 includes the plurality of busbars 72, the connector bar 104 connecting the plurality of exposed portions 73 of the plurality of busbars 72 together, and a carrier 106 connecting the plurality of busbars 72 together. The plurality of first end portions 77A, the second end portion 78A, and the third end portion 79A are connected to the carrier 106.

Figure 10:
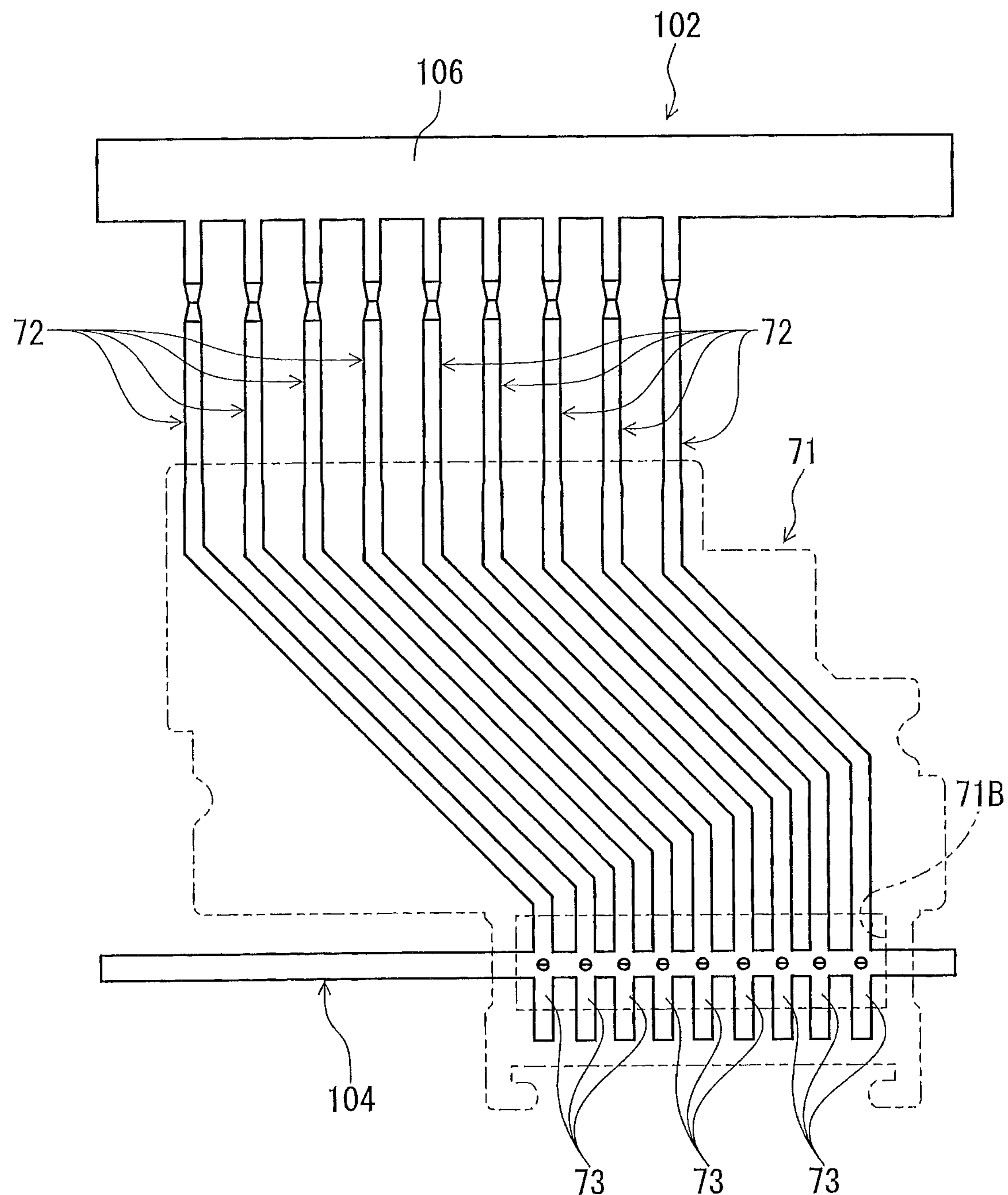
FIG. 10 is a plan view illustrating the molding step for the lead block illustrated in FIG. 3.

As illustrated in FIGS. 8 and 10, the method of manufacturing the lead block 70 includes the molding step S2 of embedding, in the lead block body 71 by insertion molding, the busbar plate 102 including the plurality of busbars 72 and the connector bar 104 connecting the plurality of exposed portions 73 of the plurality of busbars 72 together so that the plurality of exposed portions 73 is exposed from the lead block body 71.

The molding step S2 includes the step S21 of embedding the busbar plate 102 in the lead block body 71 by the insertion molding so that the plurality of exposed portions 73 and at least a portion of the connector bar 104 are disposed within the opening 71B of the lead block body 71. The molding step S2 includes the step S22 of embedding the busbar plate 102 in the lead block body 71 by the insertion molding so that a portion of the connector bar 104 is embedded in the lead block body 71. The steps S21 and S22 are typically performed by a single insertion molding operation, but may be performed by separate insertion molding operations. Additionally, one of the steps S21 and S22 may be omitted from the molding step S2.

Figure 11:
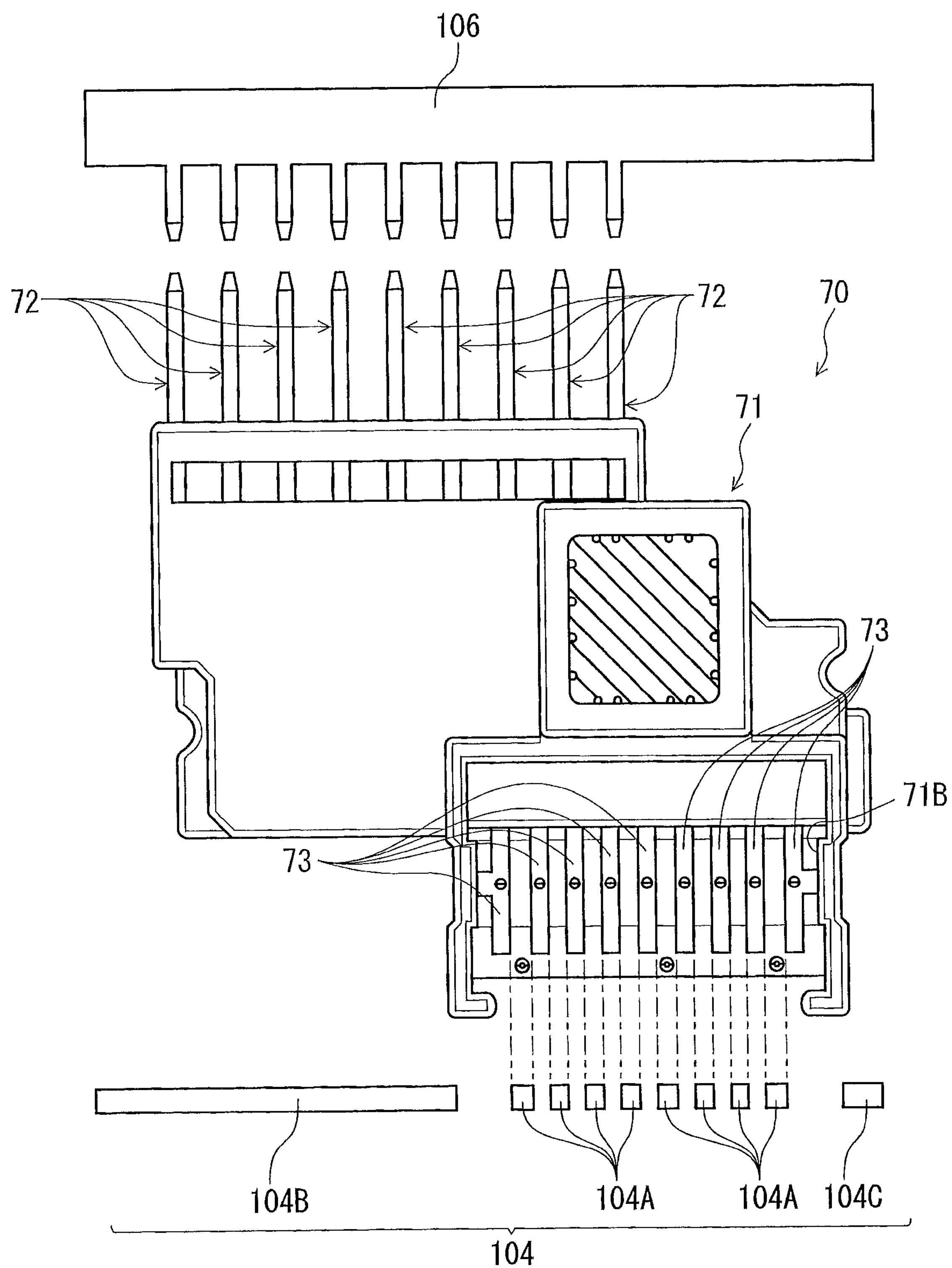
FIG. 11 is a plan view illustrating the cutting step and the carrier cutting step for the lead block illustrated in FIG. 3.

As illustrated in FIGS. 8 and 11, the method of manufacturing the lead block 70 includes the cutting step S3 of cutting the connector bar 104 off from the plurality of exposed portions 73. The cutting step S3 includes the step S31 of cutting the connector bar 104 off from the plurality of exposed portions 73 via the opening 71B in the lead block body 71. For example, in the cutting step S3, the connector bar 104 is cut off from the plurality of exposed portions 73 by press machining.

As illustrated in FIG. 11, the connector bar 104 includes a plurality of first connecting portions 104A, a second connecting portion 104B, and a third connecting portion 104C. When the plurality of first connecting portions 104A are cut off from the plurality of exposed portions 73, the plurality of first cut surfaces 90 (see FIG. 5), the plurality of first additional cut surfaces 91 (see FIG. 6), the second cut surface 93 (see FIG. 5), and the third cut surface 95 (see FIG. 6) are formed. When the second connecting portion 104B is cut off from the first protruding portion 87, the second additional cut surface 97 (see FIG. 6) is formed. When the third connecting portion 104C is cut off from the second protruding portion 88, the third additional cut surface 98 (see FIG. 5) is formed.

As illustrated in FIGS. 8 and 11, the method of manufacturing the lead block 70 includes the carrier cutting step S4 including cutting the carrier 106 off from the plurality of busbars 72. For example, by press machining, the carrier 106 is cut off from the plurality of busbars 72. Thus, the lead block 70 is manufactured. Note that in a case where the busbar plate 102 does not include the carrier 106, the carrier cutting step S4 may be omitted. Also, the cutting step S3 and the carrier cutting step S4 may be performed simultaneously as a single step or may be performed at different timings as separate steps.

The aspects of the lead block 70 according to the present embodiment are as follows.

(1) The lead block 70 includes the lead block body 71 including an electrical insulating material and the plurality of busbars 72 each partially embedded in the lead block body 71 and including an electrically conductive material. The plurality of busbars 72 include the plurality of exposed portions 73 exposed from the lead block body 71 and respectively corresponding to the plurality of busbars 72. The plurality of exposed portions 73 each extend in the longitudinal direction D4 and are disposed spaced apart from one another in the arrangement direction D5 orthogonal to the longitudinal direction D4. The plurality of exposed portions 73 include at least one first exposed portion 74. The at least one first exposed portion 74 includes the first surface 80 and the first additional surface 81 disposed on the reverse side of the first surface 80 in the arrangement direction D5. The first surface 80 includes a first cut surface 90 having an area smaller than an area of the first surface 80. The first additional surface 81 includes a first additional cut surface 91 having an area smaller than an area of the first additional surface 81.

In the lead block 70, the first cut surface 90 having the area smaller than the area of the first surface 80 is disposed on the first surface 80, and the first additional cut surface 91 having the area smaller than the area of the first additional surface 81 is disposed on the first additional surface 81. Thus, discarded materials cut off from the plurality of busbars 72 can be reduced. This enables a reduction in the manufacturing costs of the lead block 70.

(2) The first surface 80 includes the first adjacent surface 80A adjacent to the first cut surface 90. The first additional surface 81 includes the first additional adjacent surface 81A adjacent to the first additional cut surface 91. The appearance of the first cut surface 90 differs from the appearance of the first adjacent surface 80A. The appearance of the first additional cut surface 91 differs from the appearance of the first additional adjacent surface 81A. Thus, the steps of surface finishing for the first cut surface 90 and the first additional cut surface 91 can be omitted. This enables a further reduction in the manufacturing costs of the lead block 70 compared to a configuration in which the first cut surface 90 and the first additional cut surface 91 are subjected to surface finish.

(3) The first additional cut surface 91 is disposed on the reverse side of the first cut surface 90 in the arrangement direction D5. Thus, for example, during manufacture, when the connector bar connecting the plurality of exposed portions 73 is cut off from the plurality of exposed portions 73, possible deformation of the plurality of exposed portions 73 can be suppressed.

(4) The length of the first cut surface 90 in the longitudinal direction D4 is shorter than the length of the first surface 80 in the longitudinal direction D4. The length of the first additional cut surface 91 in the longitudinal direction D4 is shorter than the length of the first additional surface 81 in the longitudinal direction D4. This enables a reduction in discarded materials cut off from the plurality of busbars 72 compared to a configuration in which the length of the first cut surface 90 is equal to the length of the first surface 80 and/or the length of the first additional cut surface 91 is equal to the length of the first additional surface 81. This enables a further reduction in the manufacturing costs of the lead block 70.

(5) The plurality of exposed portions 73 include the second exposed portion 75. The second exposed portion 75 includes the second surface 83 facing toward the at least one first exposed portion 74 in the arrangement direction D5, and the second additional surface 84 disposed on the reverse side of the second surface 83 in the arrangement direction D5. The second surface 83 includes the second cut surface 93 having an area smaller than an area of the second surface 83. The second cut surface 93 having the area smaller than the area of the second surface 83 is disposed on the second surface 83, and thus, during manufacture, the discarded materials cut off from the plurality of busbars 72 can be reduced. This enables a further reduction in the manufacturing costs of the lead block 70.

(6) One of the plurality of busbars 72 includes the first protruding portion 87 protruding from the second additional surface 84 of the second exposed portion 75 in the arrangement direction D5. The first protruding portion 87 is at least partially embedded in the lead block body 71. This enables an increase in the connection strength between the second exposed portion 75 and the lead block body 71, with the manufacturing costs of the lead block 70 reduced. During manufacture, in a case where the connector bar connecting the plurality of exposed portions 73 includes the first protruding portion 87, a portion of the connector bar can be utilized to increase the connection strength, allowing facilitation of effective utilization of the material of the lead block 70, with the connection strength between the second exposed portion 75 and the lead block body 71 increased.

(7) The plurality of exposed portions 73 include the third exposed portion 76. The third exposed portion 76 includes the third surface 85 facing toward the at least one first exposed portion 74 in the arrangement direction D5, and the third additional surface 86 disposed on the reverse side of the third surface 85 in the arrangement direction D5. The third surface 85 includes the third cut surface 95 having an area smaller than an area of the third surface 85. The third cut surface 95 having the area smaller than the area of the third surface 85 is disposed on the third surface 85, and thus, during manufacture, the discarded materials cut off from the plurality of busbars 72 can be reduced. This enables a further reduction in the manufacturing costs of the lead block 70.

(8) The second protruding portion 88 is included that protrudes from the third additional surface 86 of the third exposed portion 76 in the arrangement direction D5. The second protruding portion 88 is at least partially embedded in the lead block body 71. This enables an increase in the connection strength between the third exposed portion 76 and the lead block body 71, with the manufacturing costs of the lead block 70 reduced. In a case where the connector bar connecting the plurality of exposed portions 73 at the time of manufacture includes the second protruding portion 88, a portion of the connector bar can be utilized to increase the connection strength, allowing facilitation effective utilization of the material of the lead block 70, with the connection strength between the third exposed portion 76 and the lead block body 71 increased.

(9) The plurality of busbars 72 include the at least one first busbar 77 that includes the at least one first exposed portion 74. The at least one first busbar 77 includes the first end portion 77A and the first additional end portion 77B. In the at least one first busbar 77, the first cut surface 90 and the first additional cut surface 91 are disposed between the first end portion 77A and the first additional end portion 77B. By providing the first cut surface 90 and the first additional cut surface 91 on portions other than the first end portion 77A and the first additional end portion 77B, integral holding of the plurality of busbars 72 can be facilitated with less materials during manufacture.

(10) The first end portion 77A is exposed from the lead block body 71. As viewed in the orthogonal direction D6 orthogonal to the longitudinal direction D4 and the arrangement direction D5, the first additional end portion 77B is disposed inside the contour of the lead block body 71. This allows suppression of contact of the first additional end portion 77B with another member such as a cable compared to a configuration in which the first additional end portion 77B is disposed on or outside the contour of the lead block body 71.

(11) The first additional end portion 77B is at least partially embedded in the lead block body 71. This allows reliable suppression of contact of the first additional end portion 77B with another member such as a cable.

(12) The lead block body 71 includes the opening. The first cut surface 90 and the first additional cut surface 91 are disposed within the opening. Thus, during manufacture, the connector bar connecting the plurality of exposed portions 73 together can be cut off from the plurality of connecting portions via the opening.

(13) The rotary connector device 1 includes the stator 10, the rotator 20 provided rotatably about the rotation axis A1 with respect to the stator 10, and the lead block 70. The manufacturing costs of the lead block 70 can be reduced, and thus, the manufacturing costs of the rotary connector device 1 can be reduced.

(14) The method of manufacturing the lead block 70 includes: the molding step S2 including embedding, in the lead block body 71 by the insertion molding, the busbar plate 102 including the plurality of busbars 72 and the connector bar 104 connecting the plurality of exposed portions 73 of the plurality of busbars 72 together so that the plurality of exposed portions 73 is exposed from the lead block body 71; and the cutting step S3 including cutting the connector bar 104 off from the plurality of exposed portions 73. In this manufacturing method, the discarded material cut off from the plurality of busbars 72 can be reduced. This enables a reduction in the manufacturing costs of the lead block 70.

(15) The molding step S2 includes the step S21 of embedding the busbar plate 102 in the lead block body 71 by the insertion molding so that the plurality of exposed portions 73 and at least a portion of the connector bar are disposed within the opening in the lead block body 71. This allows the peripheral portion of the plurality of exposed portions 73 to be held by the lead block body 71.

(16) The cutting step S3 includes the step S31 of cutting the connector bar 104 off from the plurality of exposed portions 73 via the opening 71B in the lead block body 71. This allows the connector bar to be cut off from the plurality of exposed portions 73, with the peripheral portion of the plurality of exposed portions 73 held by the lead block body 71. This stabilizes the cutting operation.

(17) The molding step S2 includes the step of embedding the busbar plate 102 in the lead block body 71 by the insertion molding so that a portion of the connector bar 104 embedded in the lead block body 71. This enables an increase in the connection strength between the plurality of exposed portions 73 and the lead block body 71.

(18) The method of manufacturing the lead block 70 further includes the press machining step S1 including forming, by press machining, the busbar plate 102 from the plate 100 including the electrically conductive material. The press machining enables a reduction in remaining portions cut off from the busbar plate 102 by press machining.

Figure 16:
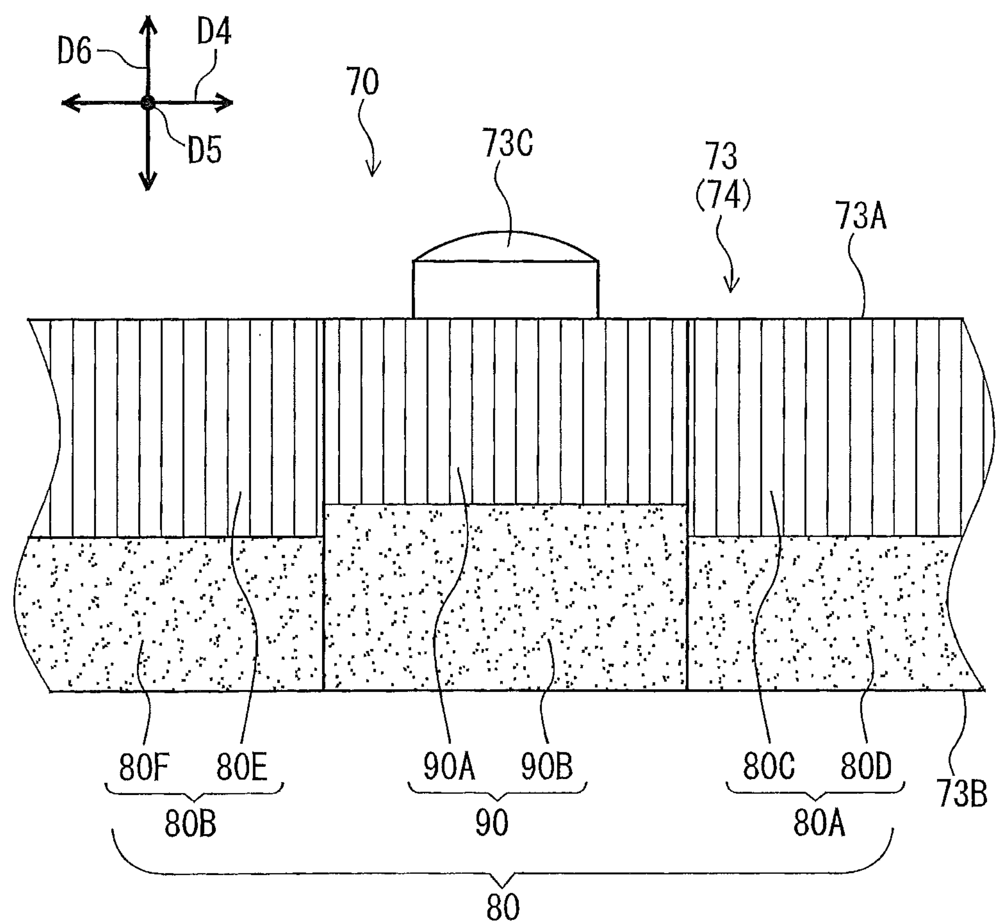
FIG. 16 is a diagram illustrating a surface state of a first surface of a lead block according to a modified example.

As illustrated in FIG. 12, in the present embodiment, the length of the first shear surface 90A in the orthogonal direction D6 is longer than the length of the shear surfaces 80C and 80E in the orthogonal direction D6. However, as illustrated in FIG. 16, the length of the first shear surface 90A in the orthogonal direction D6 may be shorter than the length of the shear surfaces 80C and 80E in the orthogonal direction D6. Additionally, the length of the first shear surface 90A in the orthogonal direction D6 may be equal to the length of the shear surfaces 80C and 80E in the orthogonal direction D6. The dimensional relationship described above can be applied to the dimensional relationship between the first additional shear surface 91A and the additional shear surfaces 81C and 81E, and to the dimensional relationship between the second shear surface 93A and the shear surfaces 83C and 83E, and to the dimensional relationship between the third shear surface 95A and the shear surfaces 85C and 85E.

Figure 17:
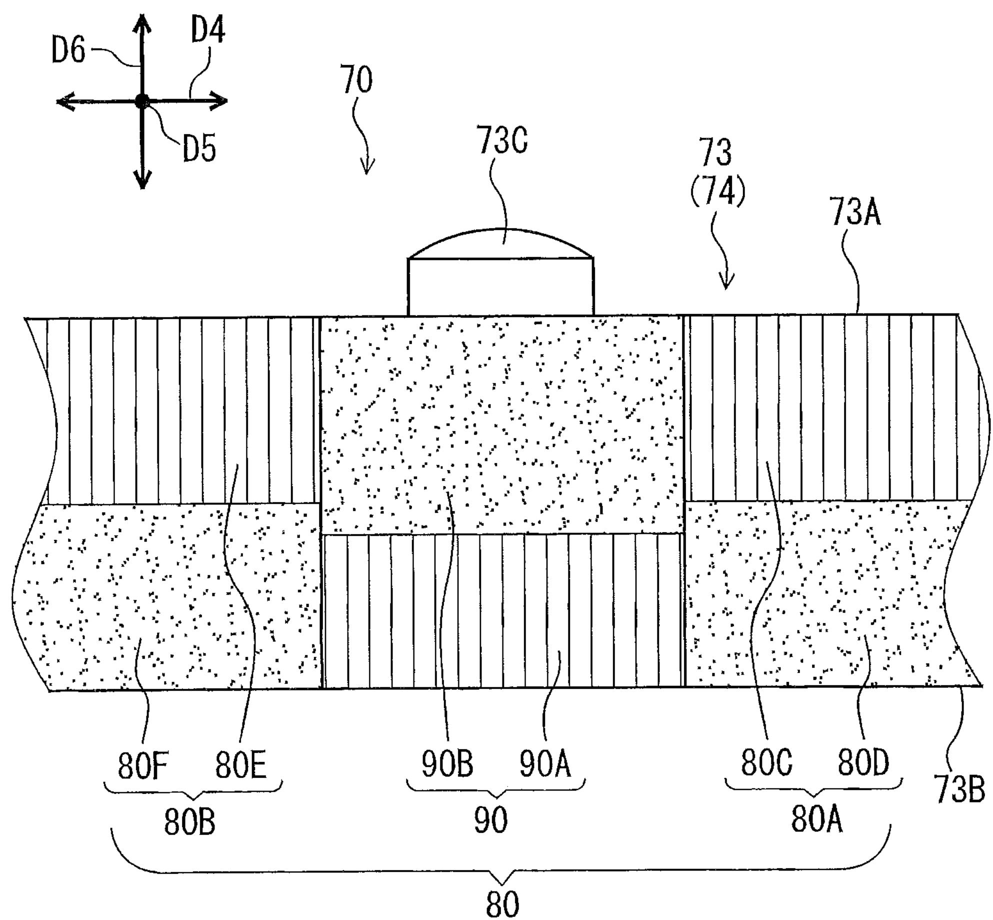
FIG. 17 is a diagram illustrating a surface state of a first surface of a lead block according to a modified example.

As illustrated in FIG. 12, in the present embodiment, the first shear surface 90A and the shear surfaces 80C and 80E are disposed closer to the cable mounting surface 73A than the first fracture surface 90B and the fracture surfaces 80D and 80F. However, as illustrated in FIG. 17, the first fracture surface 90B may be disposed near the cable mounting surface 73A.

Figure 18:
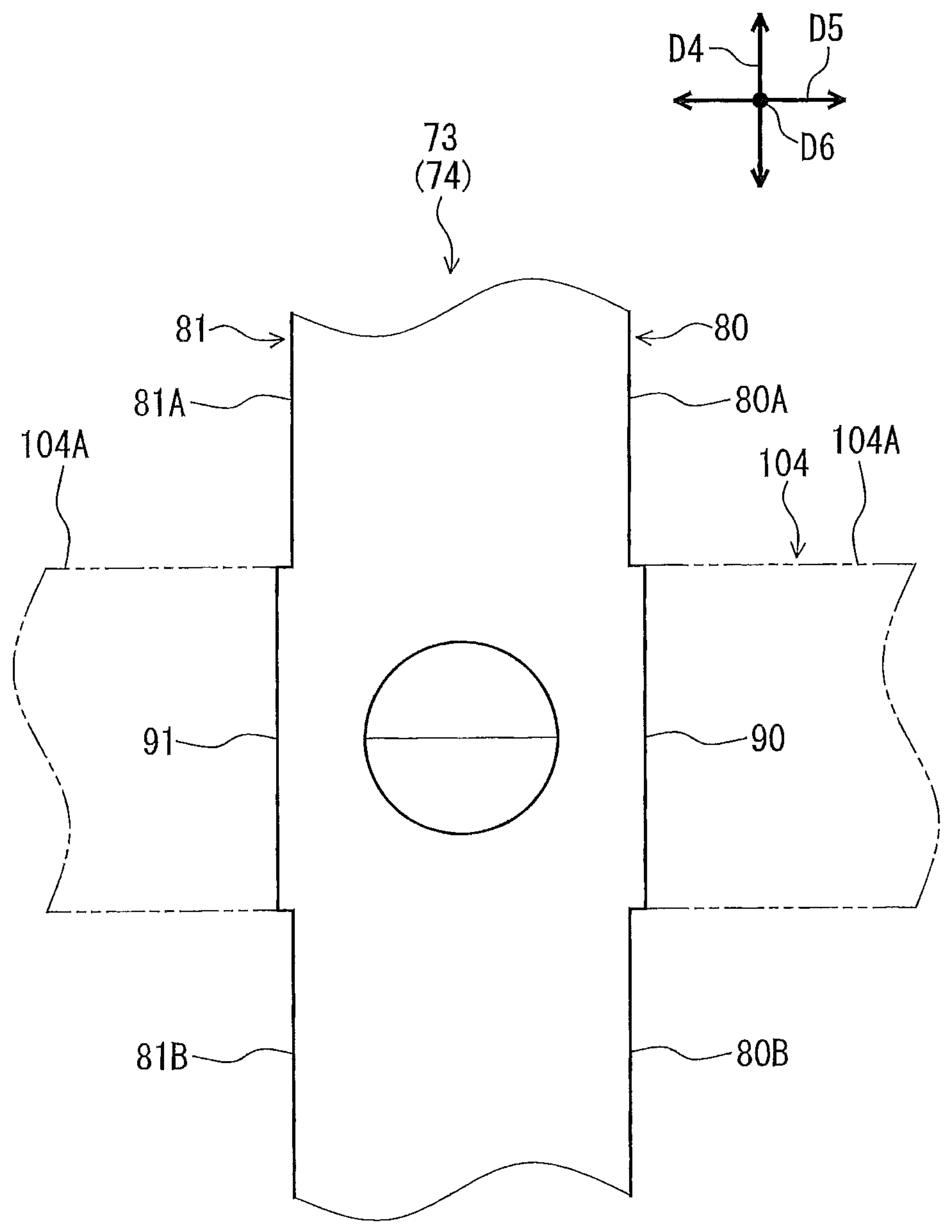
FIG. 18 illustrates a positional relationship between a first cut surface and a first adjacent surface and a positional relationship between a first additional cut surface and a first additional adjacent surface, in a lead block according to a modified example.
Figure 19:
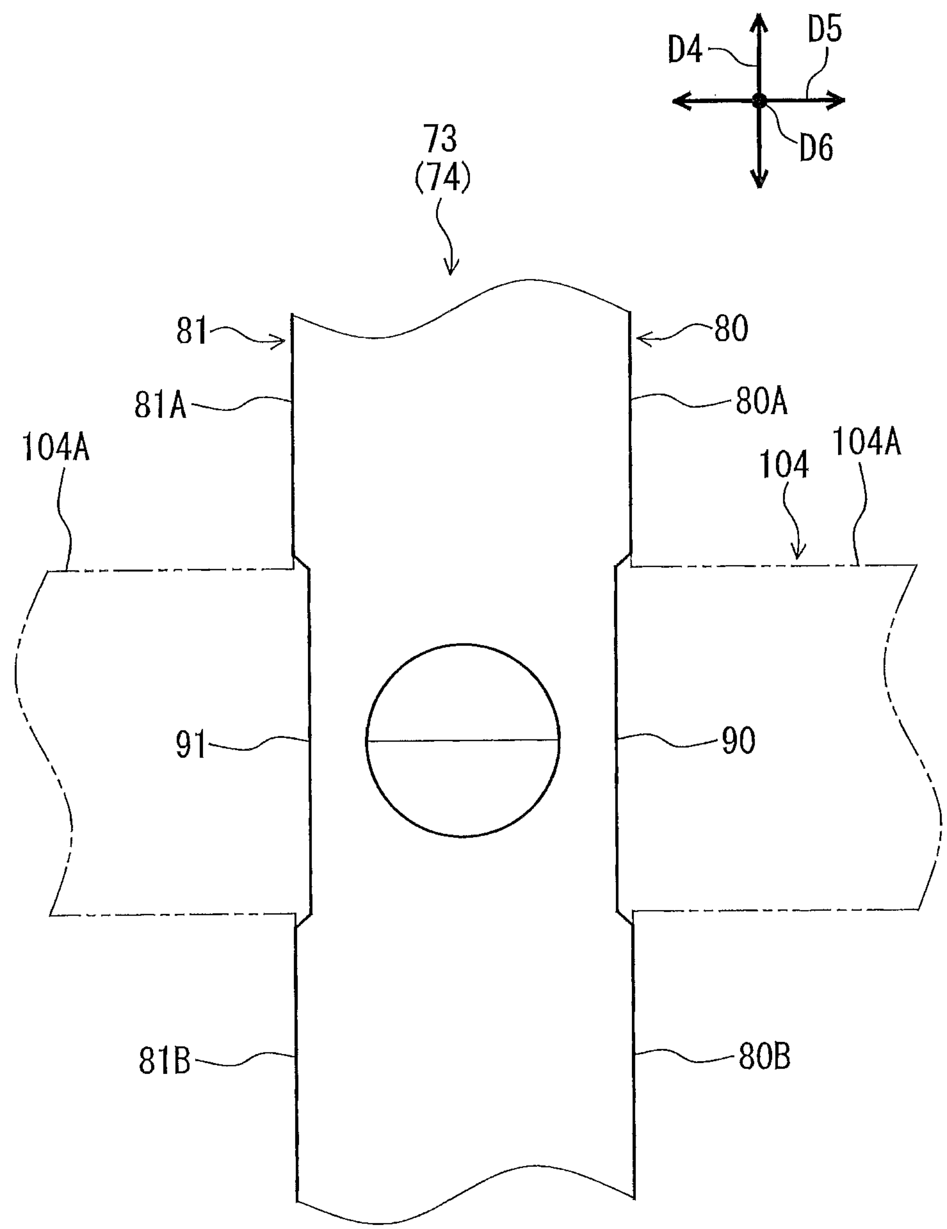
FIG. 19 illustrates a positional relationship between a first cut surface and a first adjacent surface and a positional relationship between a first additional cut surface and a first additional adjacent surface, in a lead block according to a modified example.

As illustrated in FIGS. 4 to 6, in the present embodiment, the first cut surface 90 is disposed flush with the first adjacent surfaces 80A and 80B in the arrangement direction D5. However, as illustrated in FIGS. 18 and 19, the first cut surface 90 need not be disposed flush with the first adjacent surfaces 80A and 80B. The first additional cut surface 91 need not be disposed flush with the first additional adjacent surfaces 81A and 81B. The first cut surface 90 may be offset from the first adjacent surfaces 80A and 80B in the arrangement direction D5. The first additional cut surface 91 may be offset from the first additional adjacent surfaces 81A and 81B in the arrangement direction D5. This also applies to the positional relationship between the second cut surface 93 and the second adjacent surfaces 83A and 83B in the arrangement direction D5. The above-described relationship also applies to the positional relationship between the third cut surface 95 and the third adjacent surfaces 85A and 85B in the arrangement direction D5.

In the present embodiment and the above-described modified examples, the material is cut by press machining (specifically, shearing), but any other cutting method can be applied.

It should be noted that, in the present application, "comprise" and its derivatives are open-ended terms describing the presence of a component and do not exclude the presence of other components not described. This also applies to "have", "include", and their derivatives.

In the present application, a number such as "first" or "second" is merely a term for identifying a configuration, and does not have any other meaning (e.g., a particular order, or the like). For example, the presence of a "first element" does not imply that a "second element" exists, and the presence of a "second element" does not imply that a "first element" exists.

Additionally, expressions such as "parallel", "orthogonal", and "identical" in the present disclosure should not be interpreted strictly and include respectively the meanings of "substantially parallel", "substantially orthogonal", and "substantially identical". Further, representations of other arrangements are not to be strictly interpreted.

Furthermore, the expression "at least one of A and B" in the present disclosure encompasses, for example, all of (1) only A, (2) only B, and (3) both A and B. The expression "at least one of A, B, and C" encompasses, for example, all of (1) only A, (2) only B, (3) only C, (4) A and B, (5) B and C, (6) A and C, and (7) all of A, B, and C. In the present disclosure, the expression "at least one of A and B" is not interpreted as "at least one of A and at least one of B".

Various alterations and modifications of the disclosure are apparent from the foregoing disclosure. Accordingly, the disclosure may be implemented in a manner different from the specific disclosure of the present application without departing from the spirit of the disclosure.

What is claimed is:

1. A lead block comprising:

a lead block body including an electrical insulating material;

a plurality of busbars each partially embedded in the lead block body and comprising an electrically conductive material;

the plurality of busbars comprising a plurality of exposed portions exposed from the lead block body and respectively corresponding to the plurality of busbars;

the plurality of exposed portions each extending in a longitudinal direction and disposed spaced apart from one another in an arrangement direction orthogonal to the longitudinal direction;

the plurality of exposed portions comprising at least one first exposed portion;

the at least one first exposed portion comprising a first surface and a first additional surface disposed on a reverse side of the first surface in the arrangement direction;

the first surface comprising a first cut surface having an area smaller than an area of the first surface; and the first additional surface comprising a first additional cut surface having an area smaller than an area of the first additional surface.

2. The lead block according to claim 1, wherein the first additional cut surface is disposed on a reverse side of the first cut surface in the arrangement direction.

3. The lead block according to claim 1, wherein a length of the first cut surface in the longitudinal direction is shorter than a length of the first surface in the longitudinal direction, and a length of the first additional cut surface in the longitudinal direction is shorter than a length of the first additional surface in the longitudinal direction.

4. The lead block according to claim 1, wherein the lead block body comprises an opening, and the first cut surface and the first additional cut surface are disposed in the opening.

5. The lead block according to claim 1, wherein the first surface comprises a first adjacent surface adjacent to the first cut surface, the first additional surface comprises a first additional adjacent surface adjacent to the first additional cut surface, appearance of the first cut surface differs from appearance of the first adjacent surface, and appearance of the first additional cut surface differs from appearance of the first additional adjacent surface.

6. The lead block according to claim 5, wherein the first cut surface is offset from the first adjacent surface in the arrangement direction.

7. The lead block according to claim 5, wherein the first additional cut surface is offset from the first additional adjacent surface in the arrangement direction.

8. The lead block according to claim 1, wherein the plurality of busbars comprise at least one first busbar comprising the at least one first exposed portion, the at least one first busbar comprises a first end portion and a first additional end portion, and the first cut surface and the first additional cut surface are disposed between the first end portion and the first additional end portion in the at least one first busbar.

9. The lead block according to claim 8, wherein the first end portion is exposed from the lead block body, and the first additional end portion is disposed inside a contour of the lead block body as viewed in an orthogonal direction orthogonal to the longitudinal direction and the arrangement direction.

10. The lead block according to claim 8, wherein the first additional end portion is at least partially embedded in the lead block body.

11. The lead block according to claim 1, wherein the plurality of exposed portions comprises a second exposed portion, the second exposed portion comprises a second surface facing toward the at least one first exposed portion in the arrangement direction, and a second additional surface disposed on a reverse side of the second surface in the arrangement direction, and the second surface comprises a second cut surface having an area smaller than an area of the second surface.

12. The lead block according to claim 11, wherein one of the plurality of busbars comprises a first protruding portion protruding from the second additional surface of the second exposed portion in the arrangement direction, and the first protruding portion is at least partially embedded in the lead block body.

13. The lead block according to claim 11, wherein the plurality of exposed portions comprises a third exposed portion, the third exposed portion comprises a third surface facing toward the at least one first exposed portion in the arrangement direction, and a third additional surface disposed on a reverse side of the third surface in the arrangement direction, and the third surface comprises a third cut surface having an area smaller than an area of the third surface.

14. The lead block according to claim 13, wherein one of the plurality of busbars comprises a second protruding portion protruding from the third additional surface of the third exposed portion in the arrangement direction, and the second protruding portion is at least partially embedded in the lead block body.

15. A rotary connector device comprising:

a stator;

a rotator provided rotatably about a rotation axis with respect to the stator; and a lead block comprising:

a lead block body including an electrical insulating material;

a plurality of busbars each partially embedded in the lead block body and comprising an electrically conductive material;

the plurality of busbars comprising a plurality of exposed portions exposed from the lead block body and respectively corresponding to the plurality of busbars;

the plurality of exposed portions each extending in a longitudinal direction and disposed spaced apart from one another in an arrangement direction orthogonal to the longitudinal direction;

the plurality of exposed portions comprising at least one first exposed portion;

the at least one first exposed portion comprising a first surface and a first additional surface disposed on a reverse side of the first surface in the arrangement direction;

the first surface comprising a first cut surface having an area smaller than an area of the first surface; and the first additional surface comprising a first additional cut surface having an area smaller than an area of the first additional surface.

16. A method of manufacturing a lead block, the method comprising:

embedding, in a lead block body by insertion molding, a busbar plate including a plurality of busbars and a connector bar connecting a plurality of exposed portions of the plurality of busbars together so that the plurality of exposed portions is exposed from the lead block body; and cutting the connector bar off from the plurality of exposed portions.

17. The method of manufacturing a lead block according to claim 16, wherein the embedding comprises embedding the busbar plate in the lead block body by the insertion molding so that a portion of the connector bar is embedded in the lead block body.

18. The method of manufacturing a lead block according to claim 16, the method further comprising:

forming, by press machining, the busbar plate from a plate comprising an electrically conductive material.

19. The method of manufacturing a lead block according to claim 16, wherein the embedding comprises embedding the busbar plate in the lead block body by the insertion molding so that the plurality of exposed portions and at least a portion of the connector bar are disposed in an opening of the lead block body.

20. The method of manufacturing a lead block according to claim 19, wherein the cutting comprises cutting the connector bar off from the plurality of exposed portions via the opening in the lead block body.

* * * * *